United States Patent
Liu et al.

(10) Patent No.: US 12,254,588 B2
(45) Date of Patent: Mar. 18, 2025

(54) METHOD AND DEVICE FOR PROCESSING IMAGE, DISPLAY DEVICE, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Xiaolei Liu, Beijing (CN); Jiankang Sun, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 515 days.

(21) Appl. No.: 17/642,455

(22) PCT Filed: Mar. 9, 2021

(86) PCT No.: PCT/CN2021/079774
§ 371 (c)(1),
(2) Date: Mar. 11, 2022

(87) PCT Pub. No.: WO2021/218404
PCT Pub. Date: Nov. 4, 2021

(65) Prior Publication Data
US 2022/0301101 A1 Sep. 22, 2022

(30) Foreign Application Priority Data
Apr. 26, 2020 (CN) .......................... 202010337763.0

(51) Int. Cl.
*G06T 3/4007* (2024.01)
*G06T 5/50* (2006.01)

(52) U.S. Cl.
CPC .............. *G06T 3/4007* (2013.01); *G06T 5/50* (2013.01); *G06T 2207/20224* (2013.01)

(58) Field of Classification Search
CPC ..................... G06T 3/4007; G06T 5/50; G06T 2207/20224
See application file for complete search history.

(56) References Cited

U.S. PATENT DOCUMENTS 6,724,945 B1    4/2004  Yen et al.
2014/0168511 A1 6/2014 Gong et al.

FOREIGN PATENT DOCUMENTS

CN    103856776 A    6/2014
CN    104871206 A    8/2015
(Continued)

OTHER PUBLICATIONS

Wang, Jin, Gwanggil Jeon, and Jechang Jeong. "Iterative second-order derivative-based deinterlacing algorithm." Signal Processing: Image Communication 28.5 (2013): 472-482. (Year: 2013).*
(Continued)

Primary Examiner — Vu Le
Assistant Examiner — Tracy Mangialaschi
(74) Attorney, Agent, or Firm — IPro, PLLC

(57) ABSTRACT

Provided a method for processing an image, including: acquiring an interpolation image by performing interpolation processing on a to-be-processed image, wherein the interpolation image includes a plurality of interpolation pixels; acquiring, for each of the interpolation pixels, a first candidate pixel value and a second candidate pixel value by adjusting the initial pixel value of the interpolation pixel; determining a first difference between a second derivative of the first candidate pixel value and a second derivative of a pixel value of a target original pixel; determining a second difference between a second derivative of the second candidate pixel value and the second derivative of the pixel
(Continued)

value of the target original pixel; and updating the initial pixel value of the interpolation pixel; wherein the target original pixel includes each original pixel adjacent to the interpolation pixel.

18 Claims, 9 Drawing Sheets

(56) References Cited

FOREIGN PATENT DOCUMENTS

| | | | |
|---|---|---|---|
| CN | 106875340 A | | 6/2017 |
| CN | 107610052 A | * | 1/2018 |
| CN | 111553843 A | | 8/2020 |
| JP | 2002033964 A | | 1/2002 |

OTHER PUBLICATIONS

Zhou, Dengwen, Xiaoliu Shen, and Weiming Dong. "Image zooming using directional cubic convolution interpolation." IET image processing 6.6 (2012): 627-634.

* cited by examiner

METHOD AND DEVICE FOR PROCESSING IMAGE, DISPLAY DEVICE, AND STORAGE MEDIUM

CROSS-REFERENCE TO RELATED APPLICATION

The present disclosure is a U.S. national phase application based on PCT/CN2021/079774, filed on Mar. 9, 2021, which is based on and claims priority to Chinese Patent Application No. 202010337763.0, filed on Apr. 26, 2020 and titled "METHOD AND APPARATUS FOR PROCESSING IMAGE, AND DISPLAY DEVICE", all of which are hereby incorporated by reference in their entireties for all purposes.

TECHNICAL FIELD

The present disclosure relates to the field of image processing technologies, and more particularly to a method and a device for processing an image, a display device, and a storage medium.

BACKGROUND

With the continuous development of technologies, the resolution of a display is getting higher and higher, but due to the limitation of an image sensor in the display, the resolution of an image generated by the image sensor is relatively low, such that the requirement of the display for the resolution is hardly met.

SUMMARY

The present disclosure provides a method and a device for processing an image, a display device, and a storage medium. The technical solutions are as follows.

In one aspect, a method for processing an image is provided. The method includes:
  acquiring an interpolation image by performing interpolation processing on a to-be-processed image, wherein the interpolation image includes a plurality of original pixels and a plurality of interpolation pixels, an initial pixel value of each of the interpolation pixels being determined based on a pixel value of at least one of the original pixels;
  acquiring, for each of the interpolation pixels, a first candidate pixel value and a second candidate pixel value by adjusting the initial pixel value of the interpolation pixel, wherein the first candidate pixel value is greater than the initial pixel value, and the second candidate pixel value is less than the initial pixel value;
  determining a first difference between a second derivative of the first candidate pixel value and a second derivative of a pixel value of a target original pixel among the plurality of original pixels;
  determining a second difference between a second derivative of the second candidate pixel value and the second derivative of the pixel value of the target original pixel; and
  updating the initial pixel value of the interpolation pixel by using a candidate pixel value corresponding to a smaller one of the first difference and the second difference;
  wherein the target original pixel includes each original pixel adjacent to the interpolation pixel among the plurality of original pixels.

Optionally, acquiring the first candidate pixel value and the second candidate pixel value by adjusting the initial pixel value of the interpolation pixel includes:
  acquiring the first candidate pixel value by adding a pixel step value to the initial pixel value of the interpolation pixel; and
  acquiring the second candidate pixel value by subtracting the pixel step value from the initial pixel value of the interpolation pixel.

Optionally, determining the first difference between the second derivative of the first candidate pixel value and the second derivative of the pixel value of the target original pixel among the plurality of original pixels includes:
  determining a first second derivative of the first candidate pixel value based on the first candidate pixel value and the pixel value of the target original pixel;
  determining the second derivative of the pixel value of the target original pixel based on the pixel value of the target original pixel and a pixel value of each pixel adjacent to the target original pixel; and
  determining a first difference between the first second derivative and the second derivative of the pixel value of the target original pixel; and
  determining the second difference between the second derivative of the second candidate pixel value and the second derivative of the pixel value of the target original pixel includes:
  determining a second second derivative of the second candidate pixel value based on the second candidate pixel value and the pixel value of the target original pixel; and
  determining a second difference between the second second derivative and the second derivative of the pixel value of the target original pixel.

Optionally, the target original pixel includes two first target pixels and two second target pixels, wherein a connecting line between each of the first target pixels and the interpolation pixel extends in a first direction, and a connecting line between each of the second target pixels and the interpolation pixel extends in a second direction, the first direction being perpendicular to the second direction;
  determining the first second derivative of the first candidate pixel value based on the first candidate pixel value and the pixel value of the target original pixel includes:
  determining a second derivative of the first candidate pixel value in the first direction based on the first candidate pixel value and pixel values of the two first target pixels; and
  determining a second derivative of the first candidate pixel value in the second direction based on the first candidate pixel value and pixel values of the two second target pixels;
  determining the second derivative of the pixel value of the target original pixel based on the pixel value of the target original pixel and the pixel value of each pixel adjacent to the target original pixel includes:
  determining, for each target pixel in the two first target pixels and the two second target pixels, a second derivative of a pixel value of the target pixel in the first direction based on the pixel value of the target pixel and a pixel value of a pixel, whose connecting line with the target pixel extends in the first direction, among the pixels adjacent to the target pixel; and
  determining, for each target pixel in the two first target pixels and the two second target pixels, a second derivative of a pixel value of the target pixel in the second direction based on the pixel value of the target pixel and a pixel value of a pixel, whose connecting line with the target pixel extends in the second direction, among the pixels adjacent to the target pixel; and determining the first difference between the first second derivative and the second derivative of the pixel value of the target original pixel includes:

acquiring four differences in the first direction by determining, for each target pixel in the two first target pixels and the two second target pixels, a difference between the second derivative of the first candidate pixel value in the first direction and the second derivative of the pixel value of the target pixel in the first direction;

acquiring four differences in the second direction by determining, for each target pixel in the two first target pixels and the two second target pixels, a difference between the second derivative of the first candidate pixel value in the second direction and the second derivative of the pixel value of the target pixel in the second direction; and acquiring the first difference by summing the four differences in the first direction and the four differences in the second direction.

Optionally, two first target pixels corresponding to an interpolation pixel in an $i^{th}$ row and a $j^{th}$ column in the interpolation image are a pixel in an $(i+1)^{th}$ row and a $(j-1)^{th}$ column and a pixel in an $(i-1)^{th}$ row and a $(j+1)^{th}$ column in the interpolation image; two second target pixels corresponding to the interpolation pixel in the $i^{th}$ row and the $j^{th}$ column in the interpolation image are a pixel in the $(i-1)^{th}$ row and the $(j-1)^{th}$ column and a pixel in the $(i+1)^{th}$ row and the $(j+1)^{th}$ column in the interpolation image; a second derivative $I_{11}^+(i, j)$ of a first candidate pixel value of the interpolation pixel in the $i^{th}$ row and the $j^{th}$ column in the first direction satisfies:

$$I_{11}^+(i,j)=I(i+1,j-1)+I(i-1,j+1)-2\times[I(i,j)+\Delta];$$

wherein I (i+1, j−1) is a pixel value of the pixel in the $(i+1)^{th}$ row and the $(j-1)^{th}$ column; I (i−1, j+1) is a pixel value of the pixel in the $(i-1)^{th}$ row and the $(j+1)^{th}$ column; I (i, j) is an initial pixel value of the pixel in the $i^{th}$ row and the $j^{th}$ column; $\Delta$ is a pixel step value; and i and j are both positive integers greater than 1; and a second derivative $I_{22}^+(i, j)$ of the first candidate pixel value of the interpolation pixel in the $i^{th}$ row and the $j^{th}$ column in the second direction satisfies:

$$I_{22}^+(i,j)=I(i-1,j-1)+I(i+1,j+1)-2\times[I(i,j)+\Delta];$$

wherein I (i−1, j−1) is a pixel value of the pixel in the $(i-1)^{th}$ row and the $(j-1)^{th}$ column; and I (i+1, j+1) is a pixel value of the pixel in the $(i+1)^{th}$ row and the $(j+1)^{th}$ column.

Optionally, the target original pixel includes two first target pixels and two second target pixels, wherein a connecting line between each of the first target pixels and the interpolation pixel extends in the first direction, and a connecting line between each of the second target pixels and the interpolation pixel extends in the second direction, the first direction being perpendicular to the second direction;

determining the second second derivative of the second candidate pixel value based on the second candidate pixel value and the pixel value of the target original pixel includes:

determining a second derivative of the second candidate pixel value in the first direction based on the second candidate pixel value and pixel values of the two first target pixels; and determining a second derivative of the second candidate pixel value in the second direction based on the second candidate pixel value and pixel values of the two second target pixels;

determining the second derivative of the pixel value of the target original pixel based on the pixel value of the target original pixel and the pixel value of each pixel adjacent to the target original pixel includes:

determining, for each target pixel in the two first target pixels and the two second target pixels, a second derivative of a pixel value of the target pixel in the first direction based on the pixel value of the target pixel and a pixel value of a pixel, whose connecting line with the target pixel extends in the first direction, among the pixels adjacent to the target pixel; and determining, for each target pixel in the two first target pixels and the two second target pixels, a second derivative of a pixel value of the target pixel in the second direction based on the pixel value of the target pixel and a pixel value of a pixel, whose connecting line with the target pixel extends in the second direction, among the pixels adjacent to the target pixel; and determining the second difference between the second second derivative and the second derivative of the pixel value of the target original pixel includes:

acquiring four differences in the first direction by determining, for each target pixel in the two first target pixels and the two second target pixels, a difference between the second derivative of the second candidate pixel value in the first direction and the second derivative of the pixel value of the target pixel in the first direction;

acquiring four differences in the second direction by determining, for each target pixel in the two first target pixels and the two second target pixels, a difference between the second derivative of the second candidate pixel value in the second direction and the second derivative of the pixel value of the target pixel in the second direction; and acquiring the second difference by summing the four differences in the first direction and the four differences in the second direction.

Optionally, two first target pixels corresponding to the interpolation pixel in an $i^{th}$ row and a $j^{th}$ column in the interpolation image are a pixel in an $(i+1)^{th}$ row and a $(j-1)^{th}$ column and a pixel in an $(i-1)^{th}$ row and a $(j+1)^{th}$ column in the interpolation image; two second target pixels corresponding to the interpolation pixel in the $i^{th}$ row and the $j^{th}$ column in the interpolation image are a pixel in the $(i-1)^{th}$ row and the $(j-1)^{th}$ column and a pixel in the $(i+1)^{th}$ row and the $(j+1)^{th}$ column in the interpolation image; a second derivative $I_{11}^-(i, j)$ of a second candidate pixel value of the interpolation pixel in the $i^{th}$ row and the $j^{th}$ column in the first direction satisfies:

$$I_{11}^-(i,j)=I(i+1,j-1)+I(i-1,j+1)-2\times[I(i,j)+\Delta];$$

wherein I (i+1, j−1) is a pixel value of the pixel in the $(i+1)^{th}$ row and the $(j-1)^{th}$ column; I (i−1, j+1) is a pixel value of the pixel in the $(i-1)^{th}$ row and the $(j+1)^{th}$ column; I (i, j) is an initial pixel value of the pixel in the $i^{th}$ row and the $j^{th}$ column; $\Delta$ is a pixel step value; and i and j are both positive integers greater than 1; and a second derivative $I_{22}^-(i, j)$ of the second candidate pixel value of the interpolation pixel in the $i^{th}$ row and the $j^{th}$ column in the second direction satisfies:

$$I_{22}^-(i,j)=I(i-1,j-1)+I(i+1,j+1)-2\times[I(i,j)-\Delta];$$

wherein I (i−1, j−1) is a pixel value of the pixel in the (i−1)$^{th}$ row and the (j−1)$^{th}$ column; and I (i+1, j+1) is a pixel value of the pixel in the (i+1)$^{th}$ row and the (j+1)$^{th}$ column.

Optionally, acquiring the interpolation image by performing interpolation processing on the to-be-processed image includes:

determining a first gradient of a first to-be-interpolated region in the to-be-processed image in the first direction;

determining a second gradient of the first to-be-interpolated region in a second direction perpendicular to the first direction;

in the case that the first gradient is greater than the second gradient, acquiring an initial interpolation image by performing interpolation processing on the first to-be-interpolated region in the second direction by using an interpolation algorithm;

in the case that the second gradient is greater than the first gradient, acquiring an initial interpolation image by performing interpolation processing on the first to-be-interpolated region in the first direction by using an interpolation algorithm;

determining a third gradient of a second to-be-interpolated region in the initial interpolation image in a third direction, wherein an included angle between the third direction and the first direction is 45 degrees;

determining a fourth gradient of the second to-be-interpolated region in a fourth direction perpendicular to the third direction;

in the case that the third gradient is greater than the fourth gradient, acquiring an interpolation image by performing interpolation processing on the second to-be-interpolated region in the fourth direction by using an interpolation algorithm; and in the case that the fourth gradient is greater than the third gradient, acquiring an interpolation image by performing interpolation processing on the second to-be-interpolated region in the third direction by using an interpolation algorithm.

Optionally, a pixel in a (2i−1)$^{th}$ row and a (2i−1)$^{th}$ column in the interpolation image is an original pixel, and a pixel value of the pixel in the (2i−1)$^{th}$ row and the (2i−1)$^{th}$ column in the interpolation image is equal to a pixel value of a pixel in an i$^{th}$ row and a j$^{th}$ column in the to-be-processed image.

In another aspect, a device for processing an image is provided. The device includes:

a processor; and a memory configured to store one or more instructions executable by the processor;

wherein the processor, when loading and executing the one or more instructions, is caused to perform:

acquiring an interpolation image by performing interpolation processing on a to-be-processed image, wherein the interpolation image includes a plurality of original pixels and a plurality of interpolation pixels, an initial pixel value of each interpolation pixel being determined based on a pixel value of at least one of the original pixels;

acquiring, for each of the interpolation pixels, a first candidate pixel value and a second candidate pixel value by adjusting the initial pixel value of the interpolation pixel, wherein the first candidate pixel value is greater than the initial pixel value, and the second candidate pixel value is less than the initial pixel value;

determining a first difference between a second derivative of the first candidate pixel value and a second derivative of a pixel value of a target original pixel among the plurality of original pixels;

determining a second difference between a second derivative of the second candidate pixel value and the second derivative of the pixel value of the target original pixel; and updating the initial pixel value of the interpolation pixel by using a candidate pixel value corresponding to a smaller one of the first difference and the second difference;

wherein the target original pixel includes each original pixel adjacent to the interpolation pixel among the plurality of original pixels.

Optionally, the processor, when loading and executing the one or more instructions, is caused to perform:

acquiring the first candidate pixel value by adding a pixel step value to the initial pixel value of the interpolation pixel; and acquiring the second candidate pixel value by subtracting the pixel step value from the initial pixel value of the interpolation pixel.

Optionally, the processor, when loading and executing the one or more instructions, is caused to perform:

determining a first second derivative of the first candidate pixel value based on the first candidate pixel value and the pixel value of the target original pixel;

determining the second derivative of the pixel value of the target original pixel based on the pixel value of the target original pixel and a pixel value of each pixel adjacent to the target original pixel;

determining a first difference between the first second derivative and the second derivative of the pixel value of the target original pixel; and determining a second second derivative of the second candidate pixel value based on the second candidate pixel value and the pixel value of the target original pixel; and determining a second difference between the second second derivative and the second derivative of the pixel value of the target original pixel.

In yet another aspect, a non-transitory computer-readable storage medium is provided. The computer-readable storage medium stores an instruction therein, wherein the instruction, when loaded and executed by a computer, causes the computer to perform the method for processing the image as defined in the above aspect.

In still another aspect, a display device is provided. The display device includes a display panel and a device for processing an image;

wherein the display panel is configured to display an image processed by the device for processing the image; and the device for processing the image comprises:

a processor; and a memory configured to store one or more instructions executable by the processor;

wherein the processor, when loading and executing the one or more instructions, is caused to perform:

acquiring an interpolation image by performing interpolation processing on a to-be-processed image, wherein the interpolation image comprises a plurality of original pixels and a plurality of interpolation pixels, an initial pixel value of each of the interpolation pixels being determined based on a pixel value of at least one of the original pixels;

acquiring, for each of the interpolation pixels, a first candidate pixel value and a second candidate pixel value by adjusting the initial pixel value of the interpolation pixel, wherein the first candidate pixel value is greater than the initial pixel value, and the second candidate pixel value is less than the initial pixel value;

determining a first difference between a second derivative of the first candidate pixel value and a second derivative of a pixel value of a target original pixel among the plurality of original pixels;

determining a second difference between a second derivative of the second candidate pixel value and the second derivative of the pixel value of the target original pixel; and updating the initial pixel value of the interpolation pixel by using a candidate pixel value corresponding to a smaller one of the first difference and the second difference;

wherein the target original pixel comprises each original pixel adjacent to the interpolation pixel among the plurality of original pixels.

BRIEF DESCRIPTION OF THE DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, embodiments of the present disclosure will be described in detail with reference to the accompanying drawings.

In the related art, to improve the resolution of an image and further display the image on a display, it is necessary to process the image by using a super-resolution algorithm.

However, an image processed by a method in the related art usually generates artifacts, resulting in low quality of the image.

Figure 1:
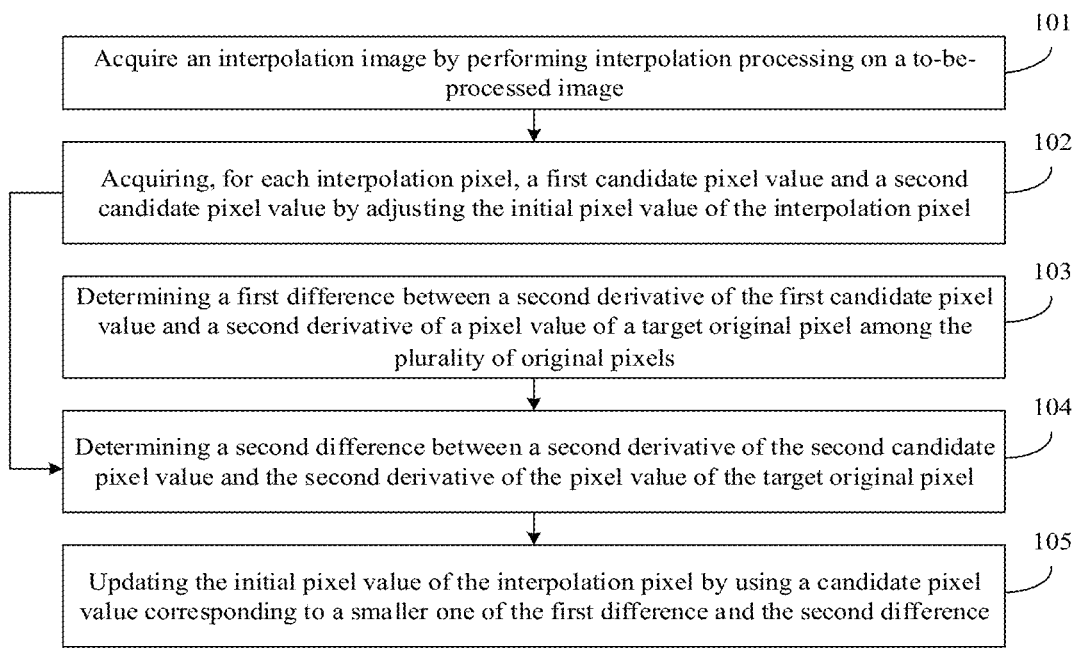
FIG. 1 is a flowchart of a method for processing an image according to an embodiment of the present disclosure.

FIG. 1 is a flowchart of a method for processing an image according to an embodiment of the present disclosure. The method may be applied to an apparatus for processing an image. Referring to FIG. 1, the method may include the following steps.

In step 101, an interpolation image is acquired by performing interpolation processing on a to-be-processed image.

In this embodiment of the present disclosure, an interpolation algorithm may be pre-stored in the apparatus for processing the image. After receiving the to-be-processed image, the apparatus for processing the image may perform interpolation processing on the to-be-processed image by using the pre-stored interpolation algorithm to acquire the interpolation image.

The interpolation image may include a plurality of original pixels and a plurality of interpolation pixels, wherein an initial pixel value of each interpolation pixel is determined based on a pixel value of at least one of the original pixels. For example, the initial pixel value of each interpolation pixel in the interpolation image may be determined based on a pixel value of each original pixel adjacent to the interpolation pixel among the plurality of original pixels.

Optionally, the interpolated algorithm pre-stored in the apparatus for processing the image may be any one of a nearest-neighbor interpolation algorithm, a bilinear interpolation algorithm, and a bicubic convolution interpolation algorithm.

In step 102, for each of the interpolation pixels, a first candidate pixel value and a second candidate pixel value are acquired by adjusting the initial pixel value of the interpolation pixel.

In this embodiment of the present disclosure, in the interpolation image acquired by performing interpolation processing on the to-be-processed image by the apparatus for processing the image, pixel values of all pixels are known pixel values. The apparatus for processing the image may adjust, for each of the interpolation pixels, the initial pixel value of the interpolation pixel to acquire the first candidate pixel value and the second candidate pixel value.

The first candidate pixel value may be greater than the initial pixel value, and the second candidate pixel value may be less than the initial pixel value. That is, for each of the interpolation pixels, two candidate pixel values corresponding to the interpolation pixel can be acquired.

In step 103, a first difference between a second derivative of the first candidate pixel value and a second derivative of a pixel value of a target original pixel among the plurality of original pixels is determined.

In this embodiment of the present disclosure, the apparatus for processing the image may determine a second derivative of each of the plurality of original pixels in the interpolation image. For each of the interpolation pixels, the apparatus for processing the image may, after determining the first candidate pixel value of the interpolation pixel, determine the second derivative of the first candidate pixel value. In addition, for each of the interpolation pixels, the apparatus for processing the image may determine the first difference between the second derivative of the first candidate pixel value of the interpolation pixel and the second derivative of the pixel value of the target original pixel among the plurality of original pixels.

The target original pixel may be each original pixel adjacent to the interpolation pixel among the plurality of original pixels. The first difference may be a difference between the second derivative of the first candidate pixel value of the interpolation pixel and the second derivative of the pixel value of each original pixel adjacent to the interpolation pixel.

It should be noted that the number of original pixels adjacent to each of the interpolation pixels is usually multiple, that is, there may be a plurality of target original pixels, such that the apparatus for processing the image may determine a difference between the second derivative of the first candidate pixel value of the interpolation pixel and the second derivative of the pixel value of each adjacent original pixel, and determine a sum of all the differences as the first difference.

It should also be noted that the second derivative of the pixel value of each of the interpolation pixels and the target original pixels may be calculated based on the pixel value of the pixel and pixel values of other pixels adjacent to the pixel.

In step 104, a second difference between a second derivative of the second candidate pixel value and the second derivative of the pixel value of the target original pixel is determined.

In this embodiment of the present disclosure, for each of the interpolation pixels, the apparatus for processing the image may, after determining the second candidate pixel value of the interpolation pixel, determine the second derivative of the second candidate pixel value. In addition, for each of the interpolation pixels, the apparatus for processing the image may determine, based on the second derivative of each of the plurality of original pixels determined in the step 103, the second difference between the second derivative of the second candidate pixel value of the interpolation pixel and the second derivative of the pixel value of the target original pixel among the plurality of original pixels.

In addition, the number of original pixels adjacent to each of the interpolation pixels is usually multiple, such that the apparatus for processing the image may determine a difference between the the second derivative of second candidate pixel value of the interpolation pixel and the second derivative of the pixel value of each adjacent original pixel, and determine a sum of all the differences as the second difference.

In step 105, the initial pixel value of the interpolation pixel is updated by using a candidate pixel value corresponding to a smaller one of the first difference and the second difference.

For the to-be-processed image, the smaller the difference between a second derivative of a pixel value of a certain pixel in the to-be-processed image and a second derivative of a pixel value of each of other pixels adjacent to this pixel, the better the image continuity in a neighborhood of the pixel in the image, and the higher the quality of the image. For example, a neighborhood of a pixel may be an L×L neighborhood of a pixel, wherein L is an odd number greater than 1, for example, L may be 5 or 7. The L×L neighborhood of the pixel may include L rows and L columns of pixels, that is, include a total of $L^2$ pixels; and the pixel may be located in the $(L+1)/2^{th}$ row and the $(L+1)/2^{th}$ column in the L×L neighborhood of the pixel.

In this embodiment of the present disclosure, the apparatus for processing the image may, after determining the first difference between the second derivative of the first candidate pixel value and the second derivative of the pixel value of the target original pixel according to the step 103 and determining the second difference between the second derivative of the second candidate pixel value and the second derivative of the pixel value of the target original pixel according to the step 104, determine values of the first difference and the second difference. The candidate pixel value corresponding to the smaller difference can make the image continuity in the neighborhood of the interpolation pixel in the interpolation image better, and the candidate pixel value corresponding to the larger difference can make the image continuity in the neighborhood of the interpolation pixel in the interpolation image poorer. Therefore, to improve the image continuity in the neighborhood of the interpolation pixel and further improve the quality of the interpolation image, for each of the interpolation pixels, the apparatus for processing the image may update the initial pixel value of the interpolation pixel by using the candidate pixel value corresponding to the smaller one of the first difference and the second difference, such that the interpolation image can be updated.

That is, in the case that the second difference is greater than the first difference, the second candidate pixel value corresponding to the second difference may be used to update the initial pixel value of the interpolation pixel, that is, the pixel value of the interpolation pixel may be made equal to the second candidate pixel value. In the case that the second difference is less than the first difference, the first candidate pixel value corresponding to the first difference may be used to update the initial pixel value of the interpolation pixel, that is, the pixel value of the interpolation pixel may be made equal to the first candidate pixel value.

In summary, a method for processing the image is provided by the embodiment of the present disclosure. According to the method, interpolation processing can be performed on a to-be-processed image first to acquire an interpolation image; and an initial pixel value of each interpolation pixel in the interpolation image is then updated, wherein a difference between a second derivative of an updated pixel value of the interpolation pixel and a second derivative of a pixel value of a target original pixel in the interpolation image is relatively small, such that artifacts generated in the interpolation image are reduced, thereby improving the image continuity in a neighborhood of the interpolation pixels in the interpolation image, and improving the quality of the final processed image.

Figure 2:
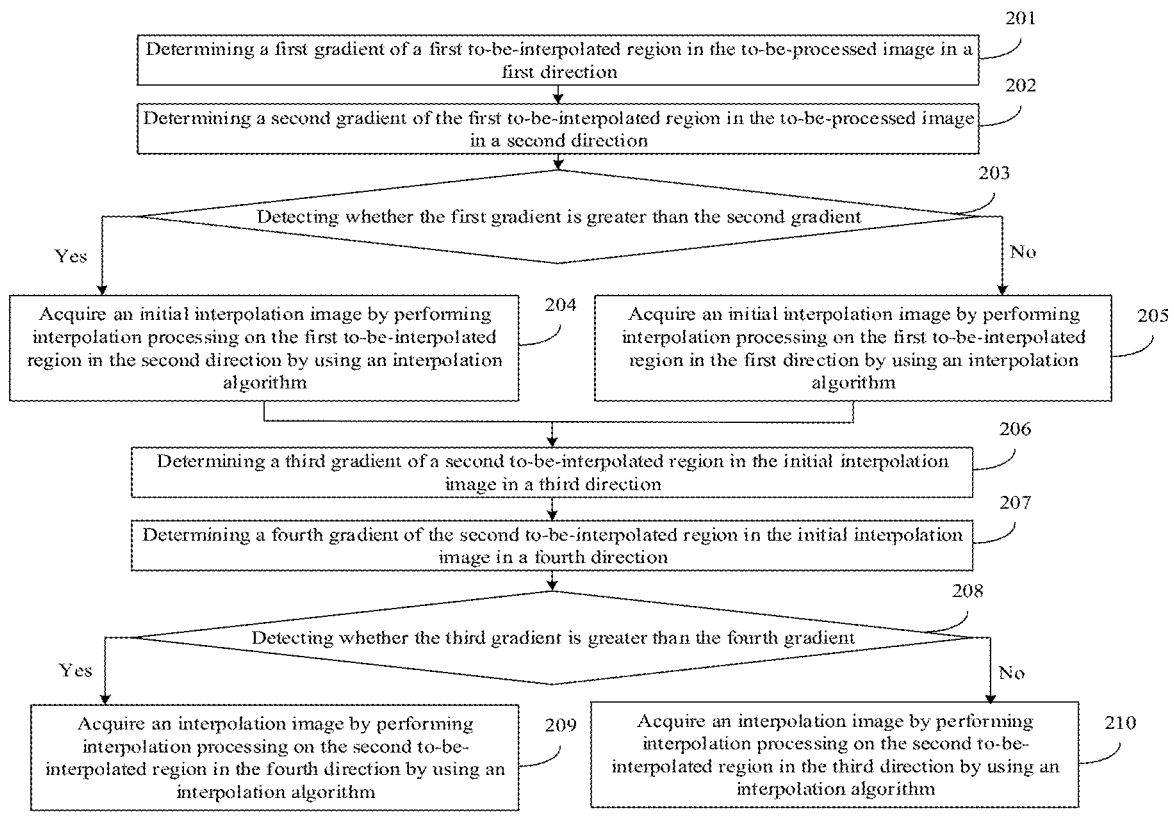
FIG. 2 is a flowchart of a method for generating an interpolation image according to an embodiment of the present disclosure.

FIG. 2 is a flowchart of a method for generating an interpolation image according to an embodiment of the present disclosure. The method may be applied to an apparatus for processing an image. Referring to FIG. 2, the method may include the following steps.

In step 201, a first gradient of a first to-be-interpolated region in the to-be-processed image in a first direction is determined.

In this embodiment of the present disclosure, a formula for calculating the gradient of the image in the first direction may be pre-stored in the apparatus for processing the image. The apparatus for processing the image may, after receiving the to-be-processed image, determine the first gradient of the first to-be-interpolated region in the to-be-processed image in the first direction by using the pre-stored formula for the gradient in the first direction. The first to-be-interpolated region may be an L1×L1 neighborhood of a certain pixel in the to-be-processed image. L1 is an odd number greater than 1.

Optionally, the first direction may be a direction with an included angle of 45° (degrees) from a pixel row direction. Assuming that the first to-be-interpolated region in the to-be-processed image is a 7×7 neighborhood of a pixel in an $i^{th}$ row and a $j^{th}$ column (i.e., L1=7), the first gradient G1 of the first to-be-interpolated region in the first direction may satisfy:

$$G1 = \Sigma_{m=3,\pm 1} \Sigma_{n=3,\pm 1} |I(i+m, j-n) - I(i+m-x, j-n+x)| \quad \text{Formula (1)}$$

wherein in the above formula (1), m, n, and x are preset gradient calculation coefficients, respectively; the value of m may be 1, 3, and −1; the value of n may also be 1, 3, and −1; and the value of x may be 2. Besides, the values of m, n, and x may also be other values, for example, the value of x may also be 1, which is not limited in the embodiments of the present disclosure. In addition, i may be configured to represent the number of rows of pixels; j may be configured to represent the number of columns of pixels; and i and j may both be positive integers greater than 1, wherein i is less than the total number of rows of pixels in the image, and j is less than the total number of columns of pixels in the image. I (i+m, j−n) is a pixel value of a pixel in an $(i+m)^{th}$ row and a $(j-n)^{th}$ column in the to-be-processed image, and I (i+m−x, j−n+x) is a pixel value of a pixel in an $(i+m-x)^{th}$ row and a $(j-n+x)^{th}$ column in the to-be-processed image. ∥ denotes taking an absolute value.

In step 202, a second gradient of the first to-be-interpolated region in the to-be-processed image in a second direction is determined.

In this embodiment of the present disclosure, a formula for calculating the gradient of the image in the second direction may be pre-stored in the apparatus for processing the image. The apparatus for processing the image may determine the second gradient of the to-be-processed image in the second direction by using the pre-stored formula for the gradient in the second direction.

Optionally, the second direction may be perpendicular to the first direction. For example, the first direction is 45°, and the second direction may be a direction with an included angle of 135° from the pixel row direction. Assuming that the first to-be-interpolated region is a 7×7 neighborhood of a pixel in the $i^{th}$ row and the $j^{th}$ column (i.e., L1=7), the second gradient G2 of the first to-be-interpolated region in the second direction may satisfy:

$$G2 = \Sigma_{m=3,\pm 1} \Sigma_{n=3,\pm 1} |I(i+m, j+n) - I(i+m-x, j-n+x)| \quad \text{Formula (2)}$$

wherein in the above formula (2), m, n, and x are preset gradient calculation coefficients, respectively; the value of m may be 1, 3, and −1; the value of n may also be 1, 3, and −1; and the value of x may be 2. Besides, the values of m, n, and x may also be other values, for example, the value of x may also be 1, which is not limited in the embodiments of the present disclosure. In addition, I (i+m, j+n) is a pixel value of a pixel in the $(i+m)^{th}$ row and a $(j+n)^{th}$ column of the to-be-processed image, and I (i+m−x, j−n+x) is a pixel value of a pixel in the $(i+m-x)^{th}$ row and the $(j-n+x)^{th}$ column of the to-be-processed image.

In step 203, whether the first gradient is greater than the second gradient is determined.

In this embodiment of the present disclosure, the apparatus for processing the image may, after determining the first gradient of the first to-be-interpolated region in the to-be-processed image in the first direction according to the step 201 and determining the second gradient of the first to-be-interpolated region in the to-be-processed image in the second direction according to the step 202, determine whether the first gradient is greater than the second gradient based on the first gradient and the second gradient.

In the case that the first gradient is greater than the second gradient, the apparatus for processing the image may perform the following step 204; in the case that the second gradient is greater than the first gradient, the apparatus for processing the image may perform the following step 205; and in the case that the first gradient is equal to the second gradient, the image of the first to-be-interpolated region may be a smooth texture image, and the apparatus for processing the image may perform either of the step 204 or the step 205.

A first determination formula for determining whether the first gradient is greater than the second gradient may be pre-stored in the apparatus for processing the image. Optionally, the first determination formula may satisfy:

$$T1 = (G1+1)/(G2+1) \quad \text{Formula (3).}$$

In this embodiment of the present disclosure, in the case that the apparatus for processing the image determines that T1 is greater than 1 according to the above formula (3), it is indicated that the first gradient is greater than the second gradient; in the case that the apparatus for processing the image determines that T1 is less than 1 according to the above formula (3), it is indicated that the second gradient is greater than the first gradient; and in the case that the apparatus for processing the image determines that T1 is equal to 1 according to the above formula (3), it is indicated that the first gradient is equal to the second gradient.

It should be noted that the first gradient may be greater than the second gradient for some first to-be-interpolated regions in the to-be-processed image, while the second gradient may be greater than the first gradient for some other first to-be-interpolated regions. Therefore, for the first to-be-interpolated region where the first gradient is greater than the second gradient, the apparatus for processing the image may perform the following step 204 to perform interpolation processing on the first to-be-interpolated region. For the first to-be-interpolated region where the second gradient is greater than the first gradient, the apparatus for processing the image may perform the following step 205 to perform interpolation processing on the first to-be-interpolated region. For the first to-be-interpolated region where the first gradient is equal to the second gradient, the apparatus for processing the image may perform either of the following step 204 or the following step 205 to perform interpolation processing on the first to-be-interpolated region.

In step 204, an initial interpolation image is acquired by performing interpolation processing on the first to-be-interpolated region in the second direction by using an interpolation algorithm.

In this embodiment of the present disclosure, in the case that the apparatus for processing the image determines that a first gradient is greater than a second gradient for a certain first to-be-interpolated region (for example, the first to-be-interpolated region is a 7×7 neighborhood of a pixel in the $i^{th}$ row and the $j^{th}$ column) according to the above step 203, it is indicated that an image of the first to-be-interpolated region may be a strong edge texture image in the second direction, and at this time, the apparatus for processing the image may perform interpolation processing on the first to-be-interpolated region in the second direction by using an interpolation algorithm, to acquire pixel values of interpolation pixels in the first to-be-interpolated region, that is, to acquire the initial interpolation image.

Optionally, the interpolated algorithm pre-stored in the apparatus for processing the image may be any one of a nearest-neighbor interpolation algorithm, a bilinear interpolation algorithm, and a bicubic convolution interpolation algorithm.

Figure 3:
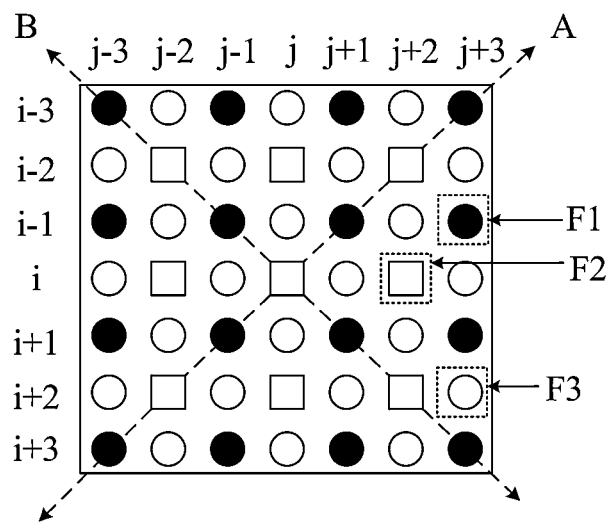
FIG. 3 is a schematic diagram of a first to-be-interpolated region according to an embodiment of the present disclosure.

In this embodiment of the present disclosure, FIG. 3 is a schematic diagram of a first to-be-interpolated region according to an embodiment of the present disclosure. Referring to FIG. 3, a pixel F1 represented by a black circle is an original pixel, and a pixel F2 represented by a white square and a pixel F3 represented by a white circle are both interpolation pixels. In addition, after the apparatus for processing the image performs interpolation processing on the first to-be-interpolated region in the second direction by using the interpolation algorithm, a pixel value of the pixel represented by the white square can be acquired.

That is, in the initial interpolation image acquired by performing interpolation processing on the first to-be-interpolated region by using the interpolation algorithm, the pixel value of the pixel represented by the white square may be a known pixel value, and a pixel value of the pixel represented by the white circle may be an unknown pixel value. A connecting line between the pixel represented by the white square and an original pixel adjacent to the pixel represented by the white square among the original pixels is a first direction A or a second direction B. For example, the first direction A or the second direction B is 45° or 135°.

It should be noted that prior to performing interpolation processing on the first to-be-interpolated region in the second direction by using the interpolation algorithm to acquire the initial interpolation image, only the pixel value of the original pixel (the pixel represented by the black circle) is a known pixel value. Therefore, the apparatus for processing the image may perform interpolation processing on the first to-be-interpolated region in the second direction by using the interpolation algorithm and the pixel values of the original pixels, to acquire the initial interpolation image.

In the case that the apparatus for processing the image performs interpolation processing on the first to-be-interpolated region in the second direction, an initial pixel value of each interpolation pixel (the pixel represented by the white square) may be determined by the apparatus for processing the image, based on a pixel value of an original pixel, whose connecting line with the interpolation pixel extends parallel to the second direction, in a L1×L1 neighborhood of the interpolation pixel and based on a weight of the pixel value of each original pixel. In addition, the greater the distance between the original pixel and the interpolation pixel, the smaller the weight of the pixel value of the original pixel; and the closer the distance between the original pixel and the interpolation pixel, the greater the weight of the pixel value of the original pixel. L1 may be equal to 7, or L1 may be equal to 5.

Exemplarily, to ensure the accuracy of the initial pixel value of the interpolation pixel acquired by the interpolation processing, the embodiment of the present disclosure is described by taking L1 being equal to 7 as an example. Referring to FIG. 3, in the 7×7 neighborhood of the interpolation pixel in the $i^{th}$ row and the $j^{th}$ column of the interpolation image, there are four original pixels, whose connecting lines with the interpolation pixel in the $i^{th}$ row and the $j^{th}$ column are parallel to the second direction B. The four original pixels are a pixel in the $(i-3)^{th}$ row and the $(j-3)^{th}$ column, a pixel in the $(i-1)^{th}$ row and the $(j-1)^{th}$ column, a pixel in the $(i+1)^{th}$ row and the $(j+1)^{th}$ column, and a pixel in the $(i+3)^{th}$ row and $(j+3)^{th}$ column. The pixel value of the interpolation pixel in the $i^{th}$ row and the $j^{th}$ column may be determined based on a pixel value of the pixel in the $(i-3)^{th}$ row and the $(j-3)^{th}$ column, a pixel value of the pixel in the $(i-1)^{th}$ row and the $(j-1)^{th}$ column, a pixel value of the pixel in the $(i+1)^{th}$ row and the $(j+1)^{th}$ column, and a pixel value of the pixel in the $(i+3)^{th}$ row and $(j+3)^{th}$ column.

In addition, since the distance between each of the pixels in the $(i-3)^{th}$ row and the $(j-3)^{th}$ column and in the $(i+3)^{th}$ row and the $(j+3)^{th}$ column and the interpolation pixel in the $i^{th}$ row and the $j^{th}$ column is greater than the distance between each of the pixels in the $(i-1)^{th}$ row and the $(j-1)^{th}$ column and in the $(i+1)^{th}$ row and $(j+1)^{th}$ column and the interpolation pixel in the $i^{th}$ row and the $j^{th}$ column, the weight of the pixel value of the pixel in the $(i-3)^{th}$ row and the $(j-3)^{th}$ column and the weight of the pixel value of the pixel in the $(i+3)^{th}$ row and the $(j+3)$th column are relatively small, and the weight of the pixel value of the pixel in the $(i-1)^{th}$ row and the $(j-1)^{th}$ column and the weight of the pixel value of the pixel in the $(i+1)^{th}$ row and $(j+1)^{th}$ column are relatively large.

Optionally, the weight of the pixel value of the pixel in the $(i-3)^{th}$ row and the $(j-3)^{th}$ column and the weight of the pixel value of the pixel in the $(i+3)^{th}$ row and the $(j+3)$th column may both be ⅙, and the weight of the pixel value of the pixel in the $(i-1)^{th}$ row and the $(j-1)^{th}$ column and the weight of the pixel value of the pixel in the $(i+1)^{th}$ row and $(j+1)^{th}$ column may both be ⅓. Therefore, assuming that the pixel value of the pixel in the $(i-3)^{th}$ row and the $(j-3)^{th}$ column is I1, the pixel value of the pixel in the $(i+3)^{th}$ row and the $(j+3)^{th}$ column is I2, the pixel value of the pixel in the $(i-1)^{th}$ row and the $(j-1)^{th}$ column is I3, and the pixel value of the pixel in the $(i+1)^{th}$ row and the $(j+1)^{th}$ column is I4, a pixel value I01 of the interpolation pixel in the $i^{th}$ row and the $j^{th}$ column, which is determined by the apparatus for processing the image, may be I01=⅙×I1+⅙×I2+⅓×I3+⅓×I4.

In step 205, an initial interpolation image is acquired by performing interpolation processing on the first to-be-interpolated region in the first direction by using an interpolation algorithm.

In this embodiment of the present disclosure, in the case that the apparatus for processing the image determines that a second gradient is greater than a first gradient for a certain first to-be-interpolated region (for example, the first to-be-interpolated region is a 7×7 neighborhood of a pixel in the $i^{th}$ row and the $j^{th}$ column) according to the above step 203, it is indicated that an image of the first to-be-interpolated region may be a strong edge texture image in the first direction, and at this time, the apparatus for processing the image may perform interpolation processing on the first to-be-interpolated region in the first direction by using the interpolation algorithm, to acquire pixel values of interpolation pixels in the first to-be-interpolated region, that is, to acquire the initial interpolation image.

The specific process of the step 205 may refer to the step 204, which is not repeated here in the embodiments of the present disclosure.

In step 206, a third gradient of a second to-be-interpolated region in the initial interpolation image in a third direction is determined.

In this embodiment of the present disclosure, a formula for calculating the gradient of the image in the third direction may be pre-stored in the apparatus for processing the image. The apparatus for processing the image may determine the third gradient of the second to-be-interpolated region in the third direction by using the pre-stored formula for the gradient in the third direction.

The second to-be-interpolated region may be an L2×L2 neighborhood in the initial interpolation image. L2 is an odd number greater than 1. In addition, the second to-be-interpolated region may have the same size as the first to-be-interpolated region, for example, L1=L2=7. Alternatively, the second to-be-interpolated region may also have a different size from the first to-be-interpolated region, for example, L1=7, L2=5.

Figure 4:
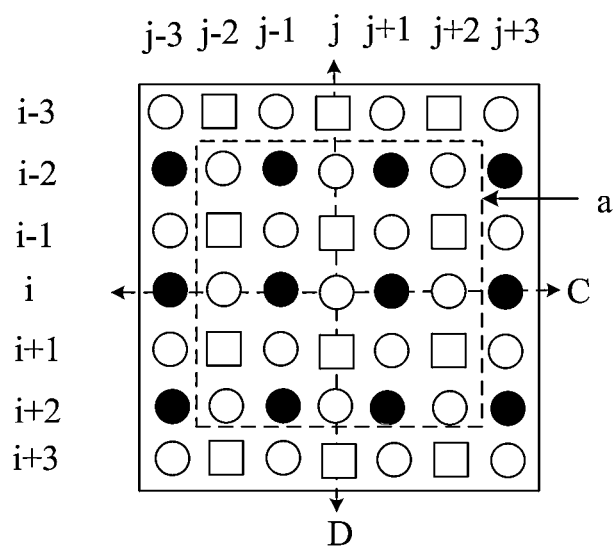
FIG. 4 is a schematic diagram of a second to-be-interpolated region according to an embodiment of the present disclosure.

Optionally, in conjunction with FIG. 3 and FIG. 4, an included angle between the third direction C and the first direction A is 45 degrees. For example, the third direction C may be a direction with an included angle of 0° from the pixel row direction. Assuming that the second to-be-interpolated region in the initial interpolation image is a 5×5 neighborhood of a pixel in the $i^{th}$ row and the $j^{th}$ column (i.e., L2=5), the third gradient G3 of the second to-be-interpolated region in the third direction C may satisfy:

$$G3=\Sigma_{r=0,2}\Sigma_{s=\pm 1}|I(i-r,j+s)-I(i-r+2,j+s)|+\Sigma_{k=0,\pm 2}|I(i-1, j+k)-I(i+1,j+k)| \quad \text{Formula (4)}$$

wherein in the above formula (4), r, s, and k are preset gradient calculation coefficients, respectively; the value of r may be 0 and 2; the value of s may also be 1 and −1; and the value of k may be −2, 0, and 2. Besides, the values of r, s, and k may also be other values, which are not limited in embodiments of the present disclosure. In addition, I (i−r, j+s) is a pixel value of a pixel in the $(i-r)^{th}$ row and the $(j+s)^{th}$ column in the to-be-processed image; I (i−r+2, j+s) is a pixel value of a pixel in the $(i-r+2)^{th}$ row and the $(j+s)^{th}$ column in the to-be-processed image; I (i−1, j+k) is a pixel value of a pixel in the $(i-1)^{th}$ row and the $(j+k)^{th}$ column in the to-be-processed image; and I (i+1, j+k) is a pixel value of a pixel in the $(i+1)^{th}$ row and the $(j+k)^{th}$ column in the to-be-processed image.

In step 207, a fourth gradient of the second to-be-interpolated region in the initial interpolation image in a fourth direction is determined.

In this embodiment of the present disclosure, a formula for calculating the gradient of the image in the fourth direction may be pre-stored in the apparatus for processing the image. The apparatus for processing the image may determine the fourth gradient of the to-be-processed image in the fourth direction by using the pre-stored formula for the gradient in the fourth direction.

Optionally, referring to FIG. 4, the fourth direction D may be perpendicular to the third direction C. For example, the fourth direction D may be a direction with an included angle of 90° from the pixel row direction. Assuming that the second to-be-interpolated region in the initial interpolation image is a 5×5 neighborhood of a pixel in the $i^{th}$ row and the $j^{th}$ column (i.e., L2=5), the fourth gradient G4 of the second to-be-interpolated region in the fourth direction D may satisfy:

$$G4=\Sigma_{r=\pm 1}\Sigma_{s=0,2}|I(i-r,j-s)-I(i+r,j-s+2)|+\Sigma_{k=0,\pm 2}|I(i+k, j-1)-I(i+k,j+1)| \quad \text{Formula (5)}$$

wherein in the above formula (5), r, s, and k are preset gradient calculation coefficients, respectively; the value of r may be 1 and −1; the value of s may also be 0 and 2; and the value of k may be −2, 0, and 2. Besides, the values of r, s, and k may also be other values, which are not limited in the embodiments of the present disclosure. In addition, I (i−r, j−s) is a pixel value of a pixel in the $(i-r)^{th}$ row and the $(j-s)^{th}$ column in the to-be-processed image; I (i+r, j−s+2) is a pixel value of a pixel in the $(i+r)^{th}$ row and the $(j-s+2)^{th}$ column in the to-be-processed image; I (i+k, j−1) is a pixel value of a pixel in the $(i+k)^{th}$ row and the $(j-1)^{th}$ column in the to-be-processed image; and I (i+k, j+1) is a pixel value of a pixel in the $(i+k)^{th}$ row and the $(j+1)^{th}$ column in the to-be-processed image.

In step 208, whether the third gradient is greater than the fourth gradient is determined.

In this embodiment of the present disclosure, the apparatus for processing the image may, after determining the third gradient of the second to-be-interpolated region in the initial interpolation image in the third direction according to the step 206 and the fourth gradient of the second to-be-interpolated region in the initial interpolation image in the fourth direction according to the step 207, determine whether the third gradient is greater than the fourth gradient based on the third gradient and the fourth gradient.

In the case that the third gradient is greater than the fourth gradient, the apparatus for processing the image may perform the following step 209; in the case that the fourth gradient is greater than the third gradient, the apparatus for processing the image may perform the following step 210: in the case that the third gradient is equal to the fourth gradient, the image of the second to-be-interpolated region may be a smooth texture image, and the apparatus for processing the image may perform either of the step 209 or the step 210.

A second determination formula for determining whether the third gradient is greater than the fourth gradient may be pre-stored in the apparatus for processing the image. Optionally, the second determination formula may satisfy:

$$T2=(G3+1)/(G4+1) \quad \text{Formula (6)}$$

In this embodiment of the present disclosure, in the case that the apparatus for processing the image determines that T2 is greater than 1 according to the above formula (6), it is indicated that the third gradient is greater than the fourth gradient; in the case that the apparatus for processing the image determines that T2 is less than 1 according to the above formula (6), it is indicated that the fourth gradient is greater than the third gradient; and in the case that the apparatus for processing the image determines that T2 is equal to 1 according to the above formula (6), it is indicated that the third gradient is equal to the fourth gradient.

It should be noted that the third gradient may be greater than the fourth gradient for some second to-be-interpolated regions in the to-be-processed image, while the fourth gradient may be greater than the third gradient for some other second to-be-interpolated regions. Therefore, for the second to-be-interpolated region where the third gradient is greater than the fourth gradient, the apparatus for processing the image may perform the following step 204 to perform interpolation processing on the second to-be-interpolated region; and for the second to-be-interpolated region where the fourth gradient is greater than the third gradient, the apparatus for processing the image may perform the following step 205 to perform interpolation processing on the second to-be-interpolated region. For the second to-be-interpolated region where the third gradient is equal to the fourth gradient, the apparatus for processing the image may perform either of the following step 209 or the following step 210 to perform interpolation processing on the second to-be-interpolated region.

In step 209, an interpolation image is acquired by performing interpolation processing on the second to-be-interpolated region in the fourth direction by using an interpolation algorithm.

In this embodiment of the present disclosure, in the case that the apparatus for processing the image determines that a third gradient is greater than a fourth gradient for a certain second to-be-interpolated region (e.g., a 5×5 neighborhood of a pixel in the $i^{th}$ row and the $j^{th}$ column) according to the above step 208, it is indicated that an image of the second to-be-interpolated region may be a strong edge texture image in the fourth direction, and at this time, the apparatus for processing the image may perform interpolation processing on the second to-be-interpolated region in the fourth direction by using the interpolation algorithm, to acquire the interpolation image.

It should be noted that referring to FIG. 4, a pixel value of an original pixel (a pixel represented by the black circle) and a pixel value of a pixel represented by the white square in the initial interpolation image are known pixel values. Therefore, the apparatus for processing the image may perform interpolation processing on the second to-be-interpolated region by using the interpolation algorithm and the pixel value of the original pixel as well as the pixel value of the pixel represented by the white square, to acquire the interpolation image.

Referring to FIG. 4, after the apparatus for processing the image performs interpolation processing on the second to-be-interpolated region in the fourth direction D by using the interpolation algorithm, a pixel value of a pixel represented by a white square can be acquired. That is, in the interpolation image acquired by performing interpolation processing on the second to-be-interpolated region by using the interpolation algorithm, the pixel values of all pixels are known pixel values. A connecting line between the pixel represented by the white circle and an original pixel adjacent to the pixel represented by the white circle is the third direction or the fourth direction, which may, for example, be 0° or 90°.

In the case that the apparatus for processing the image performs interpolation processing on the second to-be-interpolated region in the fourth direction, the initial pixel value of each interpolation pixel (the pixel represented by the white circle) may be determined by the apparatus for processing the image, based on a pixel value of each of all pixels (including original pixels and the pixels having the pixel values acquired by performing interpolation processing for the first time) having known pixel values, whose connecting line with the interpolation pixel extends parallel to the fourth direction, in a L2×L2 neighborhood of the interpolation pixel and based on a weight of each known pixel value. In addition, the greater the distance between the pixel having the known pixel value and the interpolation pixel, the smaller the weight of the pixel value of this pixel; and the closer the distance between the pixel having the known pixel value and the interpolation pixel, the greater the weight of the pixel value of this pixel. L2 may be equal to 7, or L2 may be equal to 5.

Exemplarily, to ensure the accuracy of the initial pixel value of the interpolation pixel acquired by the interpolation processing, the embodiment of the present disclosure is described by taking L2 being equal to 7 as an example. Referring to FIG. 4, in a 7×7 neighborhood of the interpolation pixel in the $i^{th}$ row and the $j^{th}$ column in the interpolation image, there are four pixels (pixels represented by white squares) with known pixel values, whose connecting lines with the interpolation pixel in the $i^{th}$ row and the $j^{th}$ column are parallel to the fourth direction D. The four pixels with known pixel values are a pixel in the $(i-3)^{th}$ row and the $j^{th}$ column, a pixel in the $(i-1)^{th}$ row and the $j^{th}$ column, a pixel in the $(i+1)^{th}$ row and the $j^{th}$ column, and a pixel in the $(i+3)^{th}$ row and $j^{th}$ column. The interpolation pixel in the $i^{th}$ row and the $j^{th}$ column may be determined based on a pixel value of the pixel in the $(i-3)^{th}$ row and the $j^{th}$ column, a pixel value of the pixel in the $(i-1)^{th}$ row and the $j^{th}$ column, a pixel value of the pixel in the $(i+1)^{th}$ row and the $j^{th}$ column, and a pixel value of the pixel in the $(i+3)^{th}$ row and $j^{th}$ column. In addition, since a distance between each of the pixels in the $(i-3)^{th}$ row and the $j^{th}$ column and in the $(i+3)^{th}$ row and the $j^{th}$ column and the interpolation pixel in the $i^{th}$ row and the $j^{th}$ column is greater than a distance each of the pixels in the $(i-1)^{th}$ row and the $j^{th}$ column and in the $(i+1)^{th}$ row and the $j^{th}$ column and the interpolation pixel in the $i^{th}$ row and the $j^{th}$ column, the weight of the pixel value of the pixel in the $(i-3)^{th}$ row and the $j^{th}$ column and the weight of the pixel value of the pixel in the $(i+3)^{th}$ row and the $j^{th}$ column are relatively small, and the weight of the pixel value of the pixel in the $(i-1)^{th}$ row and the $j^{th}$ column and the weight of the pixel value of the pixel in the $(i+1)^{th}$ row and the $j^{th}$ column are relatively large.

Optionally, the weight of the pixel value of the pixel in the $(i-3)^{th}$ row and the $j^{th}$ column and the weight of the pixel value of the pixel in the $(i+3)^{th}$ row and the $j^{th}$ column may both be ⅙, and the weight of the pixel value of the pixel in the $(i-1)^{th}$ row and the $j^{th}$ column and the weight of the pixel value of the pixel in the $(i+1)^{th}$ row and the $j^{th}$ column may both be ⅓. Therefore, assuming that the pixel value of the pixel in the $(i-3)^{th}$ row and the $j^{th}$ column is 15, the pixel value of the pixel in the $(i+3)^{th}$ row and the $j^{th}$ column is 16, the pixel value of the pixel in the $(i-1)^{th}$ row and the $j^{th}$ column is 17, and the pixel value of the pixel in the $(i+1)^{th}$ row and the $j^{th}$ column is 18, a pixel value I02 of the interpolation pixel in the $i^{th}$ row and the $j^{th}$ column, which is determined by the apparatus for processing the image, may be $I02=⅙×I5+⅙×I6+⅓×I7+⅓×I8$.

It should be noted that, prior to this interpolation processing, the apparatus for processing the image has already performed interpolation processing once and acquired the initial interpolation image. The number of pixels with known pixel values in the initial interpolation image is greater than the number of pixels with known pixel values in the to-be-interpolated image. Therefore, in the case that the apparatus for processing the image performs interpolation processing on the second to-be-interpolated region in the initial interpolation image, the initial pixel value of each interpolation pixel may be determined by using pixel values of pixels in a relatively small neighborhood of the interpolation pixel. For example, in the case that L2 is equal to 5, the apparatus for processing the image may determine the initial pixel value of each interpolation pixel by using pixel values of pixels in a 5×5 neighborhood a of the interpolation pixel.

Figure 5:
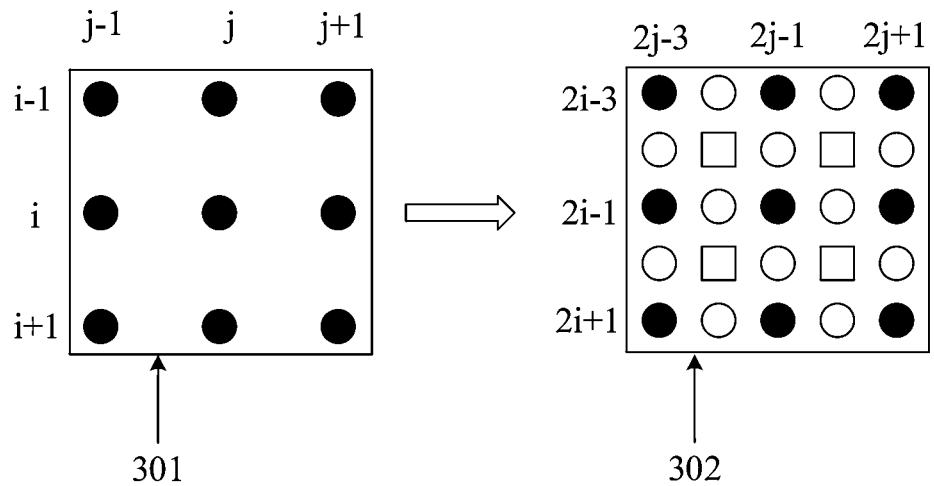
FIG. 5 is a schematic diagram showing a relationship between a to-be-processed image and an interpolation image according to an embodiment of the present disclosure.

In this embodiment of the present disclosure, referring to FIG. 5, a pixel located in the $(2i-1)^{th}$ row and the $(2j-1)^{th}$ column in the interpolation image 302 is an original pixel; and a pixel value $I_H$ $(2i-1,2j-1)$ of the pixel in the $(2i-1)^{th}$ row and the $(2j-1)^{th}$ column in the interpolation image 302 is equal to the pixel value $I_L(i, j)$ of the pixel in the $i^{th}$ row and the $j^{th}$ column in a to-be-processed image 301. That is, the to-be-processed image 301 and the interpolation image 302 satisfy the following mapping relationship:

$$I_H(2i-1,2j-1)=I_L(i,j) \quad \text{Formula (7)}.$$

In step 210, an interpolation image is acquired by performing interpolation processing on the second to-be-interpolated region in the third direction by using an interpolation algorithm.

In this embodiment of the present disclosure, in the case that the apparatus for processing the image determines that a fourth gradient is greater than a third gradient for a certain second to-be-interpolated region (e.g., a 5×5 neighborhood of a pixel in the $i^{th}$ row and the $j^{th}$ column) according to the above step 210, it is indicated that an image of the second to-be-interpolated region may be a strong edge texture image in the third direction, and at this time, the apparatus for processing the image may perform interpolation processing on the second to-be-interpolated region in the third direction by using the interpolation algorithm, to acquire the interpolation image.

The specific process of the step 210 may refer to the step 209, which is not repeated here in the embodiments of the present disclosure.

Figure 6:
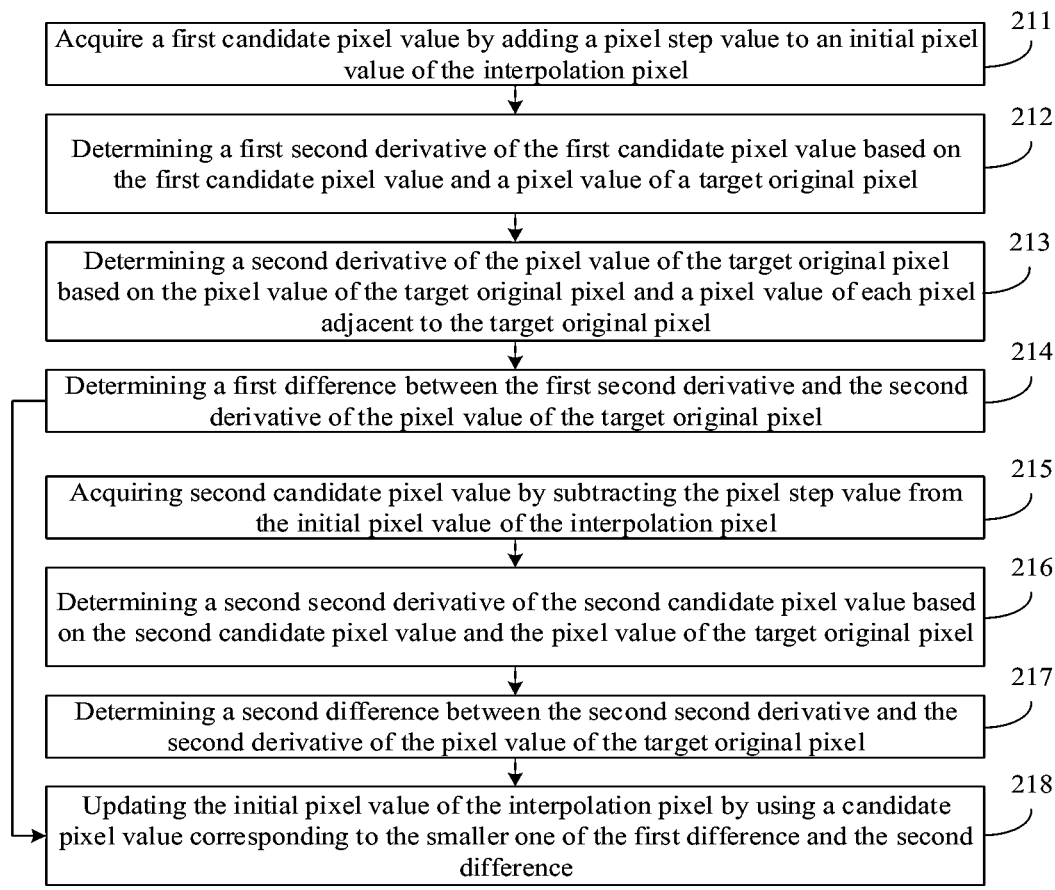
FIG. 6 is a flowchart of a method for performing image processing on the interpolation image according to an embodiment of the present disclosure.

FIG. 6 is a flowchart of a method for performing image processing on an interpolation image according to an embodiment of the present disclosure. This method may be applied to an apparatus for processing an image. It can be seen with reference to FIG. 6 that the method may include the following steps.

In step 211, a first candidate pixel value is acquired by adding a pixel step value to an initial pixel value of the interpolation pixel.

In this embodiment of the present disclosure, the pixel step value may be pre-stored in the apparatus for processing the image. After acquiring the interpolation image, the apparatus for processing the image may add the pixel step value to the initial pixel value of each interpolation pixel to acquire the first candidate pixel value. The pixel step value may range from 1 to 2, and the first candidate pixel value is greater than the initial pixel value.

Exemplarily, assuming that an initial pixel value of a certain interpolation pixel is 122 and the pixel step value is 2, the apparatus for processing the image acquires the first candidate pixel value of the interpolation pixel as 122+2=124.

In step 212, a first second derivative of the first candidate pixel value is determined based on the first candidate pixel value and a pixel value of a target original pixel.

In this embodiment of the present disclosure, to determine a first difference between the second derivative of the first candidate pixel value and a second derivative of the pixel value of the target original pixel, the apparatus for processing the image may first determine the first second derivative of the first candidate pixel value based on the pixel value of the target original pixel and the first candidate pixel value determined in the above step 211.

The target original pixel may include two first target pixels and two second target pixels. Optionally, a connecting line between each of the first target pixels and the interpolation pixel may extend in a first direction, and a connecting line between each of the second target pixels and each interpolation pixel may extend in a second direction.

Since the target original pixel includes two first target pixels and two second target pixels, the apparatus for processing the image may determine a difference between the second derivative of the pixel value of each of the four target pixels and the second derivative of the first candidate pixel value.

Figure 7:
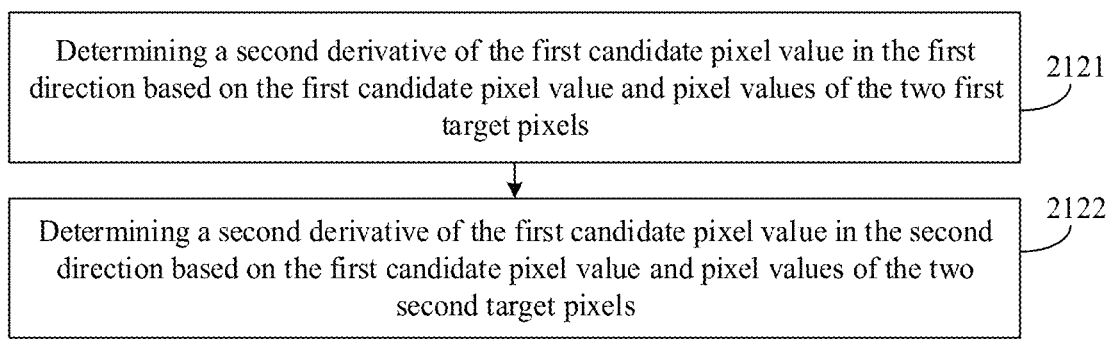
FIG. 7 is a flowchart of a method for determining a first second derivative of a first candidate pixel value according to an embodiment of the present disclosure.

FIG. 7, the step 212 may include the following steps.

In step 2121, a second derivative of the first candidate pixel value in the first direction is determined based on the first candidate pixel value and pixel values of the two first target pixels.

In this embodiment of the present disclosure, for each interpolation pixel, the apparatus for processing the image may determine a difference between a sum of the pixel values of the two first target pixels corresponding to the interpolation pixel and the first candidate pixel value of the interpolation pixel as the second derivative of the first candidate pixel value of the interpolation pixel in the first direction.

Exemplarily, referring to FIG. 4, the two first target pixels corresponding to the interpolation pixel in the $i^{th}$ row and the $j^{th}$ column in the interpolation image are a pixel in the $(i+1)^{th}$ row and the $(j-1)^{th}$ column and a pixel in the $(i-1)^{th}$ row and the $(j+1)^{th}$ column in the interpolation image, respectively. The apparatus for processing the image may determine the second derivative of the first candidate pixel value of the interpolation pixel in the $i^{th}$ row and the $j^{th}$ column in the first direction, based on a pixel value of the pixel in the $(i+1)^{th}$ row and the $(j-1)^{th}$ column, a pixel value of the pixel in the $(i-1)^{th}$ row and the $(j+1)^{th}$ column, the pixel value of the pixel in the $i^{th}$ row and the $j^{th}$ column, and the pixel step value.

Optionally, the second derivative $I_{11}$ j) of the first candidate pixel value of the interpolation pixel in the $i^{th}$ row and the $j^{th}$ column in the first direction satisfies:

$$I_{11}^{+}(i,j)=I(i+1,j-1)+I(i-1,j+1)-2\times[I(i,j)+\Delta] \quad \text{Formula (8)}$$

wherein in the above formula (8), $(i+1, j^{-1})$ is a pixel value of the pixel in the $(i+1)^{th}$ row and the $(j-1)^{th}$ column; I $(i-1, j+1)$ is a pixel value of the pixel in the $(i-1)^{th}$ row and the $(j+1)^{th}$ column; I $(i, j)$ is an initial pixel value of the pixel in the $i^{th}$ row and the $j^{th}$ column; $\Delta$ is the pixel step value; and I $(i, j)+\Delta$ is the first candidate pixel value.

In step 2122, a second derivative of the first candidate pixel value in the second direction is determined based on the first candidate pixel value and pixel values of the two second target pixels.

In this embodiment of the present disclosure, for each interpolation pixel, the apparatus for processing the image may determine a difference between a sum of the pixel values of the two second target pixels corresponding to the interpolation pixel and the first candidate pixel value of the interpolation pixel as the second derivative of the first candidate pixel value in the second direction.

Exemplarily, referring to FIG. 4, the two second target pixels corresponding to the interpolation pixel in the $i^{th}$ row and the $j^{th}$ column in the interpolation image are a pixel in the $(i-1)^{th}$ row and the $(j-1)^{th}$ column and a pixel in the $(i+1)^{th}$ row and the $(j+i)^{th}$ column, respectively. The apparatus for processing the image may determine the second derivative of the first candidate pixel value of the interpolation pixel in the $i^{th}$ row and the $j^{th}$ column in the interpolation image in the second direction based on a pixel value of the pixel in the $(i-1)^{th}$ row and the $(j-1)^{th}$ column, a pixel value of the pixel in the $(i+1)^{th}$ row and the $(j+1)^{th}$ column, the pixel value of the pixel in the $i^{th}$ row and the $j^{th}$ column, and the pixel step value.

Optionally, the second derivative $I_{22}^{+}(i, j)$ of the first candidate pixel value of the interpolation pixel in the $i^{th}$ row and the $j^{th}$ column in the second direction satisfies:

$$I_{22}^{+}(i,j)=I(i-1,j-1)+I(i+1,j+1)-2\times[I(i,j)+\Delta] \quad \text{Formula (9)}$$

wherein in the above formula (9), I (i−1, j−1) is a pixel value of the pixel in the $(i-1)^{th}$ row and the $(j-1)^{th}$ column; and I (i+1, j+1) is a pixel value of the pixel in the $(i+1)^{th}$ row and the $(j+1)^{th}$ column.

In step 213, a second derivative of the pixel value of the target original pixel is determined based on the pixel value of the target original pixel and a pixel value of each pixel adjacent to the target original pixel.

In this embodiment of the present disclosure, to be able to determine the difference between the second derivative of the first candidate pixel value and the second derivative of the pixel value of the target original pixel, the apparatus for processing the image also needs to, after determining the first second derivative of the first candidate pixel image of the interpolation pixel according to the above step 212, determine the second derivative of the pixel value of the target original pixel based on the pixel value of the target original pixel and the pixel value of each pixel adjacent to the target original pixel.

Since the target original pixel includes two first target pixels and two second target pixels, the apparatus for processing the image may determine the second derivative of the pixel value of each of the four target pixels. In addition, the apparatus for processing the image needs to determine the second derivatives of each target pixel in the first direction and the second direction respectively, that is, the second derivatives of each of the four target pixels in the first direction and the second direction can be determined respectively, namely eight second derivatives need to be determined.

Figure 8:
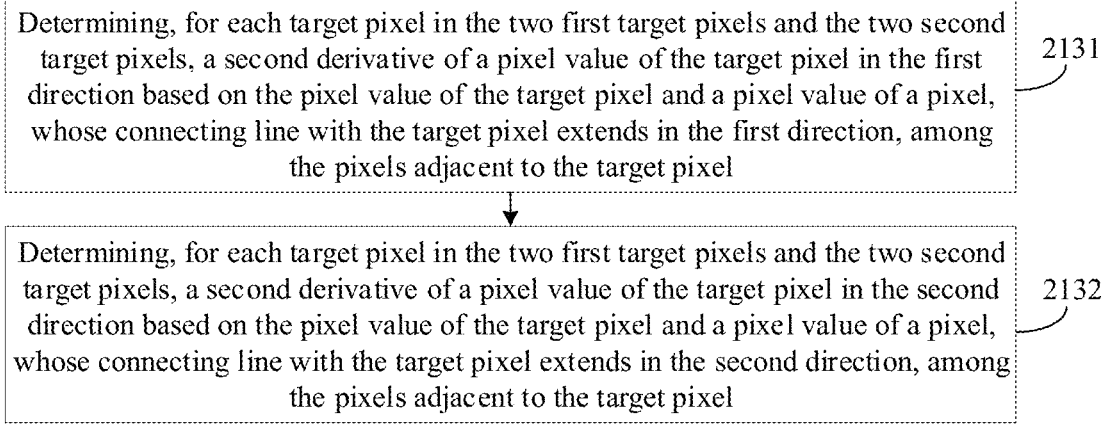
FIG. 8 is a flowchart of a method for determining a second derivative of a pixel value of a target original pixel according to an embodiment of the present disclosure.

Referring to FIG. 8, the step 213 may include the following steps.

In step 2131, for each target pixel in the two first target pixels and the two second target pixels, a second derivative of a pixel value of the target pixel in the first direction is determined based on the pixel value of the target pixel and a pixel value of a pixel, whose connecting line with the target pixel extends in the first direction, among the pixels adjacent to the target pixel.

In this embodiment of the present disclosure, for each target pixel in the two first target pixels and the two second target pixels corresponding to the interpolation pixel, the apparatus for processing the image may determine a difference between a sum of the pixel values of two pixels, whose connecting lines with the target pixel are the first direction, and the pixel value of the target pixel as the second derivative of the pixel value of the target pixel in the first direction.

Exemplarily, a second derivative $I_{11}(i+1, j-1)$ of the pixel value of the first target pixel in the $(i+1)^{th}$ row and the $(j-1)^{th}$ column corresponding to the interpolation pixel in the $i^{th}$ row and the $j^{th}$ column in the first direction satisfies:

$$I_{11}(i+1,j-1)=I(i+2,j-2)+[I(i,j)+\Delta]-2\times I(i+1,j-1),$$

wherein I (i+2, j−2) is a pixel value of a pixel in the $(i+2)^{th}$ row and the $(j-2)^{th}$ column.

A second derivative $I_{11}(i-1, j+1)$ of the pixel value of the first target pixel in the $(i-1)^{th}$ row and the $(j+1)^{th}$ column corresponding to the interpolation pixel in the $i^{th}$ row and the $j^{th}$ column in the first direction satisfies:

$$I_{11}(i+1,j-1)=I(i+2,j-2)+[I(i,j)+\Delta]-2\times I(i+1,j-1),$$

wherein I (i−2, j+2) is a pixel value of a pixel in the $(i-2)^{th}$ row and the $(j+2)^{th}$ column.

A second derivative $I_{11}(i-1, j-1)$ of the pixel value of the second target pixel in the $(i-1)^{th}$ row and the $(j-1)^{th}$ column corresponding to the interpolation pixel in the $i^{th}$ row and the $j^{th}$ column in the first direction satisfies:

$$I_{11}(i-1,j-1)=I(i,j-2)+I(i-2,j)-2\times I(i-1,j-1),$$

wherein I (i, j−2) is a pixel value of a pixel in the $i^{th}$ row and the $(j-2)^{th}$ column; and I (i−2, j) is a pixel value of a pixel in the $(i-2)^{th}$ row and the $j^{th}$ column.

A second derivative $I_{11}(i+1, j+1)$ of the pixel value of the second target pixel in the $(i+1)^{th}$ row and the $(j+1)^{th}$ column corresponding to the interpolation pixel in the $i^{th}$ row and the $j^{th}$ column in the first direction satisfies:

$$I_{11}(i+1,j+1)=I(i+2,j)+I(i,j+2)-2\times I(i+1,j+1),$$

wherein I (i+2, j) is a pixel value of a pixel in the $(i+2)^{th}$ row and the $j^{th}$ column; and I (i, j+2) is a pixel value of a pixel in the $i^{th}$ row and the $(j+2)^{th}$ column.

In step 2132, for each target pixel in the two first target pixels and the two second target pixels, a second derivative of a pixel value of the target pixel in the second direction is determined based on the pixel value of the target pixel and a pixel value of a pixel, whose connecting line with the target pixel extends in the second direction, among the pixels adjacent to the target pixel.

In this embodiment of the present disclosure, for each target pixel in the two first target pixels and the two second target pixels corresponding to the interpolation pixel, the apparatus for processing the image may determine a difference between a sum of the pixel values of two pixels, whose connecting lines with the target pixel are the second direction, and the pixel value of the target pixel as the second derivative of the pixel value of the target pixel in the second direction.

Exemplarily, a second derivative $I_{22}(i+1, j-1)$ of the pixel value of the first target pixel in the $(i+1)^{th}$ row and the $(j-1)^{th}$ column corresponding to the interpolation pixel in the $i^{th}$ row and the $j^{th}$ column in the second direction satisfies:

$$I_{22}(i+1,j-1)=I(i,j-2)+I(i+2,j)-2\times I(i+1,j-1),$$

wherein I (i, j−2) is a pixel value of a pixel in the $i^{th}$ row and the $(j-2)^{th}$ column; and I (i+2, j) is a pixel value of a pixel in the $(i+2)^{th}$ row and the $j^{th}$ column.

A second derivative $I_{22}(i-1, j+1)$ of the pixel value of the first target pixel in the $(i-1)^{th}$ row and the $(j+1)^{th}$ column corresponding to the interpolation pixel in the $i^{th}$ row and the $j^{th}$ column in the second direction satisfies:

$$I_{22}(i-1,j+1)=I(i-2,j)+I(i,j+2)-2\times I(i-1,j+1),$$

wherein I (i−2, j) is a pixel value of a pixel in the $(i-2)^{th}$ row and the $j^{th}$ column; and I (i, j+2) is a pixel value of a pixel in the $i^{th}$ row and the $(j+2)^{th}$ column.

A second derivative $I_{22}(i-1, j-1)$ of the pixel value of the second target pixel in the $(i-1)^{th}$ row and the $(j-1)^{th}$ column corresponding to the interpolation pixel in the $i^{th}$ row and the $j^{th}$ column in the second direction satisfies:

$$I_{22}(i-1,j-1)=I(i-2,j-2)+[I(i,j)+\Delta]-2\times I(i-1,j-1),$$

wherein I (i−2, j−2) is a pixel value of a pixel in the $(i-2)^{th}$ row and the $(j-2)^{th}$ column.

A second derivative $I_{22}(1+1, j+1)$ of the pixel value of the second target pixel in the $(i+1)^{th}$ row and the $(j+1)^{th}$ column corresponding to the interpolation pixel in the $i^{th}$ row and the $j^{th}$ column in the second direction satisfies:

$$I_{22}(i+1,j+1)=[I(i,j)+\Delta]+I(i+2,j+2)-2\times I(i+1,j+1),$$

wherein I (i+2, j+2) is a pixel value of a pixel in the $(i+2)^{th}$ row and the $(j+2)^{th}$ column.

In step 214, a first difference between the first second derivative and the second derivative of the pixel value of the target original pixel is determined.

In this embodiment of the present disclosure, the apparatus for processing the image may, after determining the first second derivative of the first candidate pixel value according to the step 212 and determining the second derivative of the pixel value of the target original pixel according to the step 213, determine the first difference based on the first second derivative and the second derivative of the pixel value of the target original pixel.

Figure 9:
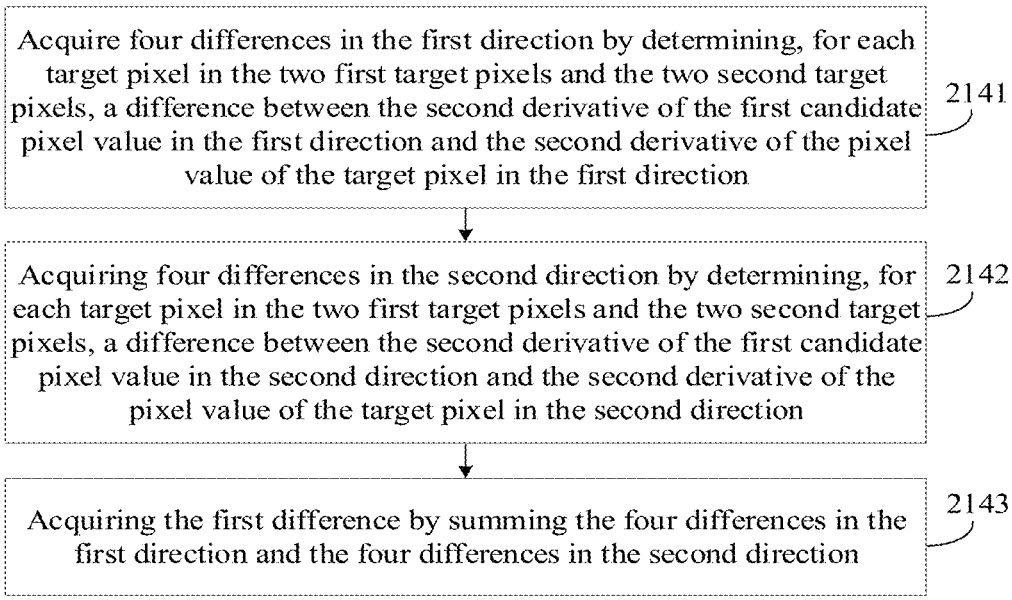
FIG. 9 is a flowchart of a method for determining a first difference according to an embodiment of the present disclosure.

Referring to FIG. 9, the step 214 may include the following steps.

In step 2141, four differences in the first direction are acquired by determining, for each target pixel in the two first target pixels and the two second target pixels, a difference between the second derivative of the first candidate pixel value in the first direction and the second derivative of the pixel value of the target pixel in the first direction.

In this embodiment of the present disclosure, the apparatus for processing the image may, after determining the second derivative of the first candidate pixel value in the first direction according to the step 2121 and determining the second derivative of the pixel value of each target pixel in the two first target pixels and the two second target pixels in the first direction, determine a difference between the second derivative of the first candidate pixel value in the first direction and the second derivative of the pixel value of each target pixel in the first direction to acquire four differences in the first direction.

Exemplarily, a difference $U_{11}$ between the second derivative of the first candidate pixel value of the interpolation pixel in the $i^{th}$ row and the $j^{th}$ column in the first direction and a second derivative of the pixel value of the first target pixel in the $(i+1)^{th}$ row and the $(j-1)^{th}$ column corresponding to the interpolation pixel in the $i^{th}$ row and the $j^{th}$ column in the first direction satisfies: $U_{11}=|I_{11}^{+}(i, j)-I(i+1, j-1)|$.

A difference $U_{12}$ between the second derivative of the first candidate pixel value of the interpolation pixel in the $i^{th}$ row and the $j^{th}$ column in the first direction and a second derivative of the pixel value of the first target pixel in the $(i-1)^{th}$ row and the $(j+1)^{th}$ column corresponding to the interpolation pixel in the $i^{th}$ row and the $j^{th}$ column in the first direction satisfies: $U_{12}=|I_{11}^{+}(i, j)-I_{11}(i-1, j+1)|$.

A difference $U_{13}$ between the second derivative of the first candidate pixel value of the interpolation pixel in the $i^{th}$ row and the $j^{th}$ column in the first direction and a second derivative of the pixel value of the second target pixel in the $(i-1)^{th}$ row and the $(j-1)^{th}$ column corresponding to the interpolation pixel in the $i^{th}$ row and the $j^{th}$ column in the first direction satisfies: $U_{13}=|I_{11}^{+}(i, j)-I_{11}(i-1, j-1)|$.

A difference $U_{14}$ between the second derivative of the first candidate pixel value of the interpolation pixel in the $i^{th}$ row and the $j^{th}$ column in the first direction and a second derivative of the pixel value of the second target pixel in the $(i+1)^{th}$ row and the $(j+1)^{th}$ column corresponding to the interpolation pixel in the $i^{th}$ row and the $j^{th}$ column in the first direction satisfies: $U_{14}=|I_{11}^{+}(i, j)-I_{11}(i+1, j+1)|$.

In step 2142, four differences in the second direction are acquired by determining, for each target pixel in the two first target pixels and the two second target pixels, a difference between the second derivative of the first candidate pixel value in the second direction and the second derivative of the pixel value of the target pixel in the second direction.

In this embodiment of the present disclosure, the apparatus for processing the image may, after determining the second derivative of the first candidate pixel value in the second direction according to the step 2122 and the second derivative of the pixel value of each target pixel in the two first target pixels and the two second target pixels in the second direction, determine a difference between the second derivative of the first candidate pixel value in the second direction and the second derivative of the pixel value of each target pixel in the second direction to acquire four differences in the second direction.

Exemplarily, a difference $U_{15}$ between the second derivative of the first candidate pixel value of the interpolation pixel in the $i^{th}$ row and the $j^{th}$ column in the second direction and a second derivative of the pixel value of the first target pixel in the $(i+1)^{th}$ row and the $(j-1)^{th}$ column corresponding to the interpolation pixel in the $i^{th}$ row and the $j^{th}$ column in the second direction satisfies: $U_{15}=|I_{22}^{+}(i, j)-I_{22}(i+1, j-1)|$.

A difference $U_{16}$ between the second derivative of the first candidate pixel value of the interpolation pixel in the $i^{th}$ row and the $j^{th}$ column in the second direction and a second derivative of the pixel value of the first target pixel in the $(i-1)^{th}$ row and the $(j+1)^{th}$ column corresponding to the interpolation pixel in the $i^{th}$ row and the $j^{th}$ column in the second direction satisfies: $U_{16}=|I_{22}^{+}(i, j)-I_{22}(i-1, j+1)|$.

A difference $U_{17}$ between the second derivative of the first candidate pixel value of the interpolation pixel in the $i^{th}$ row and the $j^{th}$ column in the second direction and a second derivative of the pixel value of the second target pixel in the $(i-1)^{th}$ row and the $(j-1)^{th}$ column corresponding to the interpolation pixel in the $i^{th}$ row and the $j^{th}$ column in the second direction satisfies: $U_{17}=|I_{22}^{+}(i, j)-I_{22}(i-1, j-1)|$.

A difference $U_{18}$ between the second derivative of the first candidate pixel value of the interpolation pixel in the $i^{th}$ row and the $j^{th}$ column in the second direction and a second derivative of the pixel value of the second target pixel in the $(i+1)^{th}$ row and the $(j+1)^{th}$ column corresponding to the interpolation pixel in the $i^{th}$ row and the $j^{th}$ column in the second direction satisfies: $U_{18}=|I_{22}^{+}(i, j)-I_{22}(i+1, j+1)|$.

In step 2143, the first difference is acquired by summing the four differences in the first direction and the four differences in the second direction.

In this embodiment of the present disclosure, the apparatus for processing the image may, after determining the four differences in the first direction according to the step 2141 and determining the fourth differences in the second direction according to the step 2142, sum the four differences in the first direction and the four differences in the second direction to acquire the first difference.

The first difference $U^{+}(i, j)$ satisfies:

$$U^{+}(i,j)=U_{11}+U_{12}+U_{13}+U_{14}+U_{15}+U_{16}+U_{17}+U_{18}.$$

That is, the first difference $U^{+}(i, j)$ satisfies:

$$U^{+}(i, j) = \qquad \text{Formula (10)}$$
$$|I_{11}^{+}(i, j) - I_{11}(i+1, j+1)| + |I_{22}^{+}(i, j) - I_{22}(i+1, j+1)| +$$
$$|I_{11}^{+}(i, j) - I_{11}(i+1, j-1)| + |I_{22}^{+}(i, j) - I_{22}(i+1, j-1)| +$$
$$|I_{11}^{+}(i, j) - I_{11}(i-1, j+1)| + |I_{22}^{+}(i, j) - I_{22}(i-1, j+1)| +$$
$$|I_{11}^{+}(i, j) - I_{11}(i-1, j-1)| + |I_{22}^{+}(i, j) - I_{22}(i-1, j-1)|$$

In step 215, a second candidate pixel value is acquired by subtracting the pixel step value from the initial pixel value of the interpolation pixel.

In this embodiment of the present disclosure, for each interpolation pixel, the apparatus for processing the image may subtract the pixel step value from the initial pixel value of the interpolation pixel to acquire the second candidate pixel value, the second candidate pixel value being less than the initial pixel value.

Exemplarily, assuming that an initial pixel value of a certain interpolation pixel is 122 and the pixel step value is 2, the apparatus for processing the image acquires the second candidate pixel value of the interpolation pixel as 122−2=120.

In step 216, a second second derivative of the second candidate pixel value is determined based on the second candidate pixel value and the pixel value of the target original pixel.

In this embodiment of the present disclosure, to determine the second difference between the second derivative of the second candidate pixel value and the second derivative of the pixel value of the target original pixel, the apparatus for processing the image may determine the second second derivative of the second candidate pixel value based on the pixel value of the target original pixel and the second candidate pixel value determined in the above step 215.

Since the target original pixel includes two first target pixels and two second target pixels, the apparatus for processing the image may determine the difference between the second derivative of the pixel value of each of the four target pixels and the second derivative of the second candidate pixel value.

Figure 10:
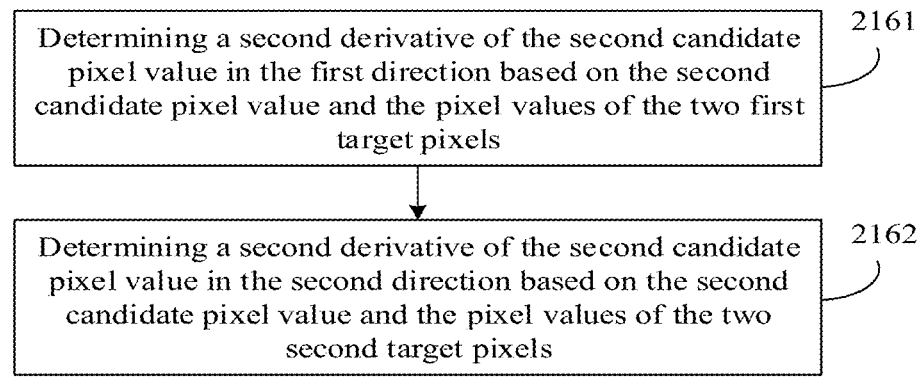
FIG. 10 is a flowchart of a method for determining a second second derivative of a second candidate pixel value according to an embodiment of the present disclosure.

Referring to FIG. 10, the step 216 may include the following steps.

In step 2161, a second derivative of the second candidate pixel value in the first direction is determined based on the second candidate pixel value and pixel values of the two first target pixels.

In this embodiment of the present disclosure, for each interpolation pixel, the apparatus for processing the image may determine a difference between a sum of pixel values of the two first target pixels corresponding to the interpolation pixel and the second candidate pixel value of the interpolation pixel as the second derivative of the second candidate pixel value in the first direction.

Exemplarily, referring to FIG. 4, the apparatus for processing the image may determine a second derivative of a second candidate pixel value of the interpolation pixel in the $i^{th}$ row and the $j^{th}$ column in the first direction based on a pixel value of a pixel in the $(i+1)^{th}$ row and the $(j−1)^{th}$ column, a pixel value of the pixel in the $(i−1)^{th}$ row and the $(j+1)^{th}$ column, the pixel value of a pixel in the $i^{th}$ row and the $j^{th}$ column, and the pixel step value.

Optionally, a second derivative $I_{11}^{-}(j)$ of the second candidate pixel value of the interpolation pixel in the $i^{th}$ row and the $j^{th}$ column in the first direction satisfies:

$$I_{11}^{-}(i,j)=I(i+1,j-1)+I(i-1,j+1)-2\times[I(i,j)-\Delta] \quad \text{Formula (11)}$$

wherein in the above formula (11), I (i+1, j−1) is a pixel value of the pixel in the $(i+1)^{th}$ row and the $(j−1)^{th}$ column; I (i−1, j+1) is a pixel value of the pixel in the $(i−1)^{th}$ row and the $(j+1)^{th}$ column; I (i, j) is an initial pixel value of the pixel in the $i^{th}$ row and the $j^{th}$ column; Δ is the pixel step value; and I (i, j)−Δ is the second candidate pixel value.

In step 2162, a second derivative of the second candidate pixel value in the second direction is determined based on the second candidate pixel value and pixel values of the two second target pixels.

In this embodiment of the present disclosure, for each interpolation pixel, the apparatus for processing the image may determine a difference between a sum of the pixel values of the two second target pixels and the second candidate pixel value of the interpolation pixel as the second derivative of the second candidate pixel value in the second direction.

Exemplarily, the apparatus for processing the image may determine the second derivative of the second candidate pixel value of the interpolation pixel in the $i^{th}$ row and the $j^{th}$ column in the second direction based on the pixel value of the pixel in the $(i−1)^{th}$ row and the $(j−1)^{th}$ column, the pixel value of the pixel in the $(i+1)^{th}$ row and the $(j+1)^{th}$ column, the pixel value of the pixel in the $i^{th}$ row and the $j^{th}$ column, and the pixel step value.

Optionally, a second derivative $I_{22}^{-}(i, j)$ of the second candidate pixel value of the interpolation pixel in the $i^{th}$ row and the $j^{th}$ column in the second direction satisfies:

$$I_{22}^{-}(i,j)=I(i-1,j-1)+I(i+1,j+1)-2\times[I(i,j)-\Delta] \quad \text{Formula (12)}$$

wherein in the above formula (12), I (i−1, j−1) is a pixel value of the pixel in the $(i−1)^{th}$ row and the $(j−1)^{th}$ column; and I (i+1, j+1) is a pixel value of the pixel in the $(i+1)^{th}$ row and the $(j+1)^{th}$ column.

In step 217, a second difference between the second second derivative and the second derivative of the pixel value of the target original pixel is determined.

In this embodiment of the present disclosure, the apparatus for processing the image may, after determining the second second derivative of the second candidate pixel value of the interpolation pixel according to the step 216 and the second derivative of the pixel value of the target original pixel according to the step 213, determine the second difference based on the second second derivative and the second derivative of the pixel value of the target original pixel.

Figure 11:
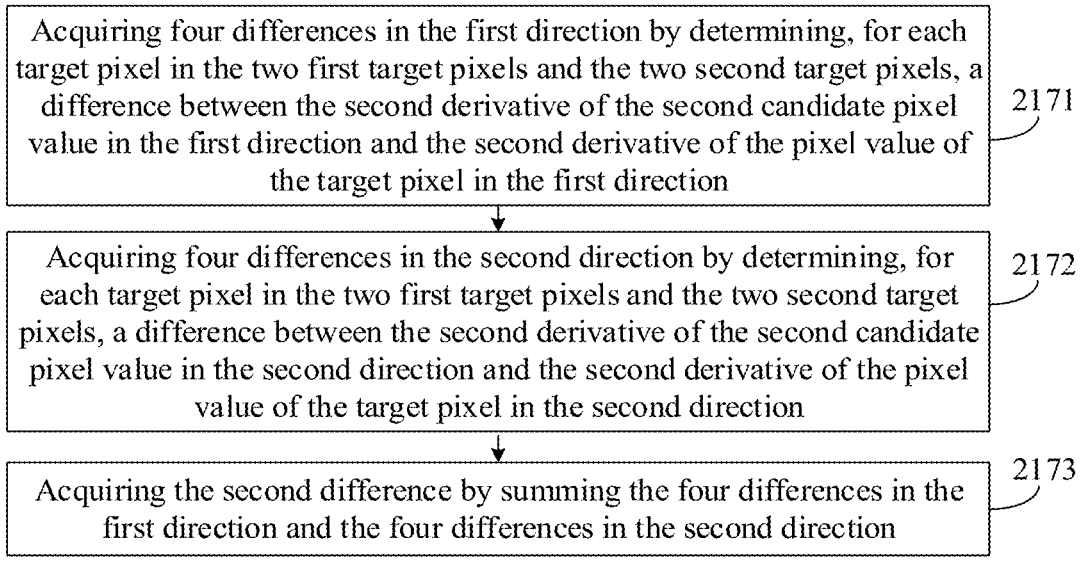
FIG. 11 is a flowchart of a method for determining a second difference according to an embodiment of the present disclosure.

Referring to FIG. 11, the step 217 may include the following steps.

In step 2171, four differences in the first direction are acquired by determining, for each target pixel in the two first target pixels and the two second target pixels, a difference between the second derivative of the second candidate pixel value in the first direction and the second derivative of the pixel value of the target pixel in the first direction.

In this embodiment of the present disclosure, the apparatus for processing the image may, after determining the second derivative of the second candidate pixel value in the first direction according to the step 2161 and determining the second derivative of the pixel value of each target pixel in the two first target pixels and the two second target pixels in the first direction according to the step 2131, determine a difference between the second derivative of the second candidate pixel value in the first direction and the second derivative of the pixel value of each target pixel in the first direction to acquire four differences in the first direction.

Exemplarily, a difference $U_{21}$ between a second derivative of the second candidate pixel value of the interpolation pixel in the $i^{th}$ row and the $j^{th}$ column in the first direction and a second derivative of a pixel value of the first target pixel in the $(i+1)^{th}$ row and the $(j−1)^{th}$ column in the first direction satisfies: $U_{21}=|I_{11}^{-}(i, j)-I_{11}(i+1, j-1)|$.

A difference $U_{22}$ between the second derivative of the second candidate pixel value of the interpolation pixel in the $i^{th}$ row and the $j^{th}$ column in the first direction and a second derivative of a pixel value of the first target pixel in the $(i-1)^{th}$ row and the $(j+1)^{th}$ column in the first direction satisfies: $U_{22}=|I_{11}^-(i, j)-I_{11}(i-1, j+1)|$.

A difference $U_{23}$ between the second derivative of the second candidate pixel value of the interpolation pixel in the $i^{th}$ row and the $j^{th}$ column in the first direction and a second derivative of a pixel value of the second target pixel in the $(i-1)^{th}$ row and the $(j-1)^{th}$ column in the first direction satisfies: $U_{23}=|I_{11}^-(i, j)-I_{11}(i-1, j-1)|$.

A difference $U_{24}$ between the second derivative of the second candidate pixel value of the interpolation pixel in the $i^{th}$ row and the $j^{th}$ column in the first direction and a second derivative of a pixel value of the second target pixel in the $(i+1)^{th}$ row and the $(j+1)^{th}$ column in the first direction satisfies: $U_{24}=|I_{11}^-(i, j)-I_{11}(i+1, j+1)|$.

In step 2172, four differences in the second direction are acquired by determining, for each target pixel in the two first target pixels and the two second target pixels, a difference between a second derivative of the second candidate pixel value in the second direction and a second derivative of the pixel value of the target pixel in the second direction.

In this embodiment of the present disclosure, the apparatus for processing the image may, after determining the second derivative of the second candidate pixel value in the second direction according to the step 2162 and determining the second derivative of the pixel value of each target pixel in the two first target pixels and the two second target pixels in the second direction according to the step 2132, determine a difference between the second derivative of the second candidate pixel value in the second direction and the second derivative of the pixel value of each target pixel in the second direction to acquire four differences in the second direction.

Exemplarily, a difference $U_{25}$ between a second derivative of the second candidate pixel value of the interpolation pixel in the $i^{th}$ row and the $j^{th}$ column in the second direction and a second derivative of a pixel value of the first target pixel in the $(i+1)^{th}$ row and the $(j+1)^{th}$ column corresponding to the interpolation pixel in the $i^{th}$ row and the $j^{th}$ column in the second direction satisfies: $U_{25}=|I_{22}^-(i, j)-I_{22}(i+1, j-1)|$.

A difference $U_{26}$ between the second derivative of the second candidate pixel value of the interpolation pixel in the $i^{th}$ row and the $j^{th}$ column in the second direction and a second derivative of a pixel value of the first target pixel in the $(i-1)^{th}$ row and the $(j+1)^{th}$ column corresponding to the interpolation pixel in the $i^{th}$ row and the $j^{th}$ column in the second direction satisfies: $U_{26}=|I_{22}^-(i, j)-I_{22}(i-1, j+1)|$.

A difference $U_{27}$ between the second derivative of the second candidate pixel value of the interpolation pixel in the $i^{th}$ row and the $j^{th}$ column in the second direction and a second derivative of a pixel value of the second target pixel in the $(i-1)^{th}$ row and the $(j-1)^{th}$ column corresponding to the interpolation pixel in the $i^{th}$ row and the $j^{th}$ column in the second direction satisfies: $U_{27}=|I_{22}^-(i, j)-I_{22}(i-1, j-1)|$.

A difference $U_{28}$ between the second derivative of the second candidate pixel value of the interpolation pixel in the $i^{th}$ row and the $j^{th}$ column in the second direction and a second derivative of a pixel value of the second target pixel in the $(i+1)^{th}$ row and the $(j+1)^{th}$ column corresponding to the interpolation pixel in the $i^{th}$ row and the $j^{th}$ column in the second direction satisfies: $U_{28}=|I_{22}^-(i, j)-I_{22}(i+1, j-1)|$.

In step 2173, a second difference is acquired by summing the four differences in the first direction and the four differences in the second direction.

In this embodiment of the present disclosure, the apparatus for processing the image may, after determining the four differences in the first direction according to the step 2171 and determining the fourth differences in the second direction according to the step 2172, sum the four differences in the first direction and the four differences in the second direction to acquire the second difference.

The second difference $U^-(i, j)$ satisfies:

$$U^-(i,j)=U_{21}+U_{22}+U_{23}+U_{24}+U_{25}+U_{26}+U_{27}+U_{28}.$$

That is, the second difference $U^-(i, j)$ satisfies:

$$U^-(i, j) = \qquad \text{Formula (13)}$$
$$|I_{11}^-(i, j) - I_{11}(i+1, j+1)| + |I_{22}^-(i, j) - I_{22}(i+1, j+1)| +$$
$$|I_{11}^-(i, j) - I_{11}(i+1, j-1)| + |I_{22}^-(i, j) - I_{22}(i+1, j-1)| +$$
$$|I_{11}^-(i, j) - I_{11}(i-1, j+1)| + |I_{22}^-(i, j) - I_{22}(i-1, j+1)| +$$
$$|I_{11}^-(i, j) - I_{11}(i-1, j-1)| + |I_{22}^-(i, j) - I_{22}(i-1, j-1)|$$

In step 218, the initial pixel value of the interpolation pixel is updated by using a candidate pixel value corresponding to the smaller one of the first difference and the second difference.

In this embodiment of the present disclosure, for a certain image, the smaller a difference between a second derivative of a pixel value of a certain pixel in the image and a second derivative of a pixel value of each of other pixels adjacent to the pixel, the better the image continuity in the neighborhood of the pixel in the image, and the higher the quality of the image.

Therefore, the apparatus for processing the image may, after determining the first difference $U^+$ (i, j) between the second derivative of the first candidate pixel value and the second derivative of the pixel value of the target original pixel according to the step 214 and determining the second difference $U^-$ (i, j) between the second derivative of the second candidate pixel value and the second derivative of the pixel value of the target original pixel according to the step 217, determine the values of the first difference and the second difference. A candidate pixel value corresponding to the smaller difference can make the image continuity in the neighborhood of the interpolation pixel in the interpolation image better, and a candidate pixel value corresponding to the larger difference can make the image continuity in the neighborhood of the interpolation pixel in the interpolation image poorer. Therefore, to improve the image continuity in the neighborhood of the interpolation pixel and further improve the quality of the interpolation image, for each interpolation pixel, the apparatus for processing the image can update the initial pixel value of the interpolation pixel by using the candidate pixel value corresponding to the smaller one of the first difference and the second difference.

That is, in the case that the second difference is greater than the first difference, the second candidate pixel value corresponding to the second difference may be used to update the initial pixel value of the interpolation pixel, that is, the pixel value of the interpolation pixel may be made equal to the second candidate pixel value. In the case that the second difference is less than or equal to the first difference, the first candidate pixel value corresponding to the first difference may be used to update the initial pixel value of the interpolation pixel, that is, the pixel value of the interpolation pixel may be made equal to the first candidate pixel value.

It should be noted that the apparatus for processing the image may perform the above steps 211 to 218 in a loop, that is, may continuously update pixel values of each interpolation pixel in the interpolation image, thereby improving the quality of the interpolation image. The apparatus for processing the image may stop when the number of times of the loop in which the above-mentioned steps 211 to 218 are performed in a loop is greater than or equal to a number threshold, and determine an image acquired at the time of stopping the loop as a final processed image. The number threshold may range from 20 times to 50 times.

In the case that the apparatus for processing the image, for a certain interpolation pixel, updates an initial pixel value of the interpolation pixel by using a target candidate pixel value of the first candidate pixel value and the second candidate pixel when performing the step 218 for the first time, the apparatus for processing the image may, when performing the steps 211 to 218, replace the initial pixel value of the interpolation pixel with the target candidate pixel value, and adjust this target candidate pixel value to acquire a new first candidate pixel value and a new second candidate pixel. The new first candidate pixel value is greater than the target candidate pixel value, and the new second candidate pixel value is less than the target candidate pixel value.

Therefore, the above step 211 may be that the first candidate pixel value is acquired by adding the pixel step value to the target candidate pixel value of the interpolation pixel. The above step 215 may be that the second candidate pixel value is acquired by subtracting the pixel step value from the target candidate pixel value of the interpolation pixel.

Figure 12:
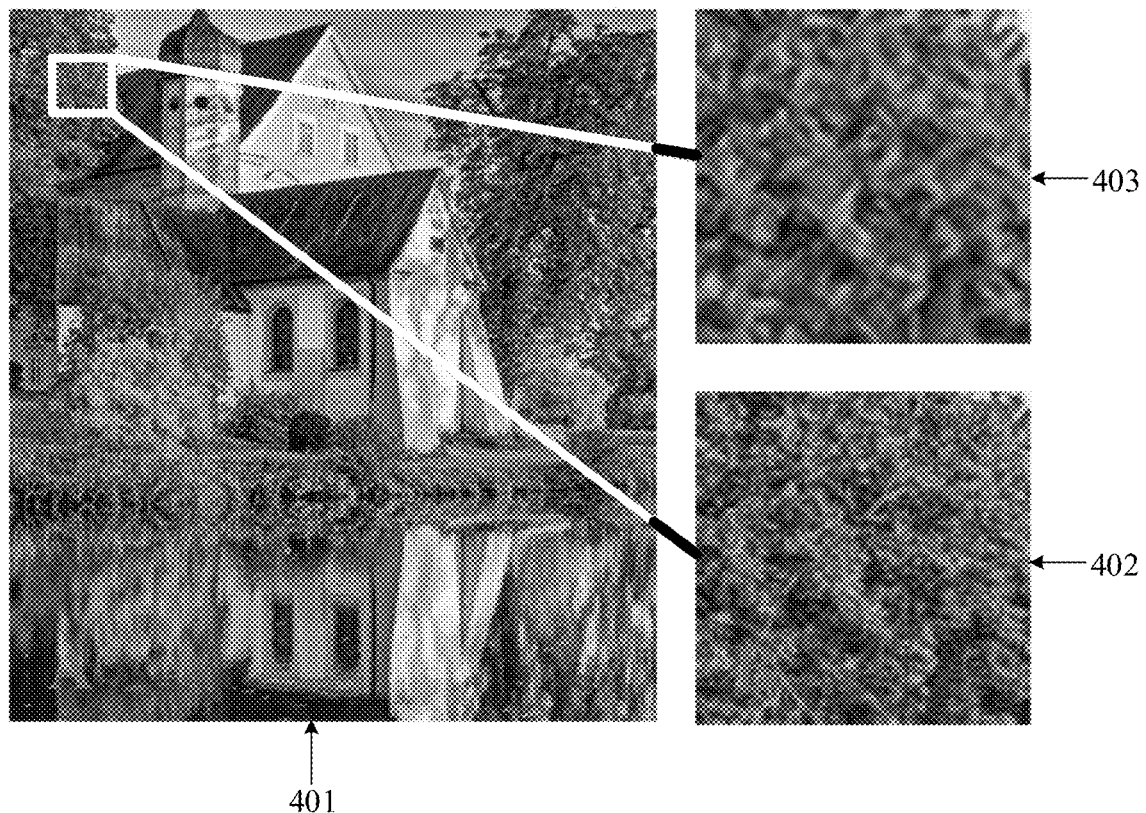
FIG. 12 is a schematic diagram of an image processing effect according to an embodiment of the present disclosure.

FIG. 12 is a schematic diagram of an image processing effect according to an embodiment of the present disclosure. In FIG. 12, 401 represents a to-be-processed image; 402 represents a partial image acquired by processing the to-be-processed image 401 by using the method for processing the image provided in the above embodiments of the present disclosure; and 403 represents a partial image acquired by processing the to-be-processed image 401 by using an interpolation algorithm merely. With reference to FIG. 12, it can be seen that the image acquired by processing the to-be-processed image 401 by using the interpolation algorithm merely has artifacts and texture distortion. However, the image 402 acquired by using the method for processing the image provided by the above embodiments of the present disclosure has relatively clear texture and better image quality.

It should be noted that, since a second derivative of an interpolation pixel located at the edge of the image cannot be calculated, there is no need to perform the above steps 211 to 218 on the interpolation pixel located at the edge of the image. That is, the apparatus for processing the image may acquire the interpolation pixel at the edge of the image through the interpolation algorithm, without adjusting its pixel value. In addition, the interpolation pixel does not have a major impact on the quality of the image because it is located at the edge of the image.

It should be noted that the sequence of the steps of the method for processing the image according to the above embodiment of the present disclosure may be adjusted appropriately, and the steps may also be increased or decreased accordingly according to the situation. For example, the step 202 may be performed before the step 201, the step 207 may be performed before the step 206, and the step 212, and the steps 215 to 217 may be performed before the step 211. Within the technical scope disclosed in the present disclosure, any variations of the method easily derived by a person of ordinary skill in the art shall fall within the protection scope of the present disclosure, which is not repeated here.

In summary, a method for processing the image is provided by the embodiment of the present disclosure. According to the method, interpolation processing can be performed on a to-be-processed image first to acquire an interpolation image; and an initial pixel value of each interpolation pixel in the interpolation image is then updated, wherein a difference between a second derivative of an updated pixel value of the interpolation pixel and a second derivative of a pixel value of a target original pixel in the interpolation image is relatively small, such that artifacts generated in the interpolation image are reduced, thereby improving the image continuity in a neighborhood of the interpolation pixels in the interpolation image, and improving the quality of the final processed image.

Figure 13:
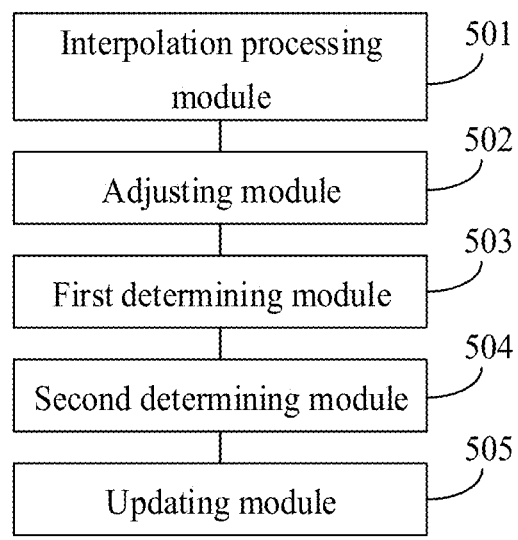
FIG. 13 is a schematic structural diagram of an apparatus for processing an image according to an embodiment of the present disclosure.

FIG. 13 is a schematic structural diagram of another apparatus for processing an image according to an embodiment of the present disclosure. Referring to FIG. 13, the apparatus may include the following modules.

An interpolation processing module 501 is configured to acquire an interpolation image by performing interpolation processing on a to-be-processed image.

The interpolation image may include a plurality of original pixels and a plurality of interpolation pixels, wherein an initial pixel value of each of the interpolation pixels is determined based on a pixel value of at least one of the original pixels.

An adjusting module 502 is configured to acquire, for each of the interpolation pixels, a first candidate pixel value and a second candidate pixel value by adjusting the initial pixel value of the interpolation pixel.

The first candidate pixel value is greater than the initial pixel value, and the second candidate pixel value is less than the initial pixel value.

A first determining module 503 is configured to determine a first difference between a second derivative of the first candidate pixel value and a second derivative of a pixel value of a target original pixel among the plurality of original pixels.

The target original pixel includes each original pixel adjacent to the interpolation pixel among the plurality of original pixels.

A second determining module 504 is configured to determine a second difference between a second derivative of the second candidate pixel value and the second derivative of the pixel value of the target original pixel.

An updating module 505 is configured to update the initial pixel value of the interpolation pixel by using a candidate pixel value corresponding to a smaller one of the first difference and the second difference.

In summary, an apparatus for processing an image is provided by the embodiment of the present disclosure. According to the apparatus, interpolation processing can be performed on a to-be-processed image first to acquire an interpolation image; and an initial pixel value of each interpolation pixel in the interpolation image is then updated, wherein a difference between a second derivative of an updated pixel value of the interpolation pixel and a second derivative of a pixel value of a target original pixel in the interpolation image is relatively small, such that artifacts generated in the interpolation image are reduced, thereby improving the image continuity in a region where the interpolation pixels are located in the interpolation image, and improving the quality of the final processed image.

Optionally, the adjusting module 502 may be configured to:
acquire the first candidate pixel value by adding a pixel step value to the initial pixel value of the interpolation pixel; and acquire the second candidate pixel value by subtracting the pixel step value from the initial pixel value of the interpolation pixel.

Figure 14:
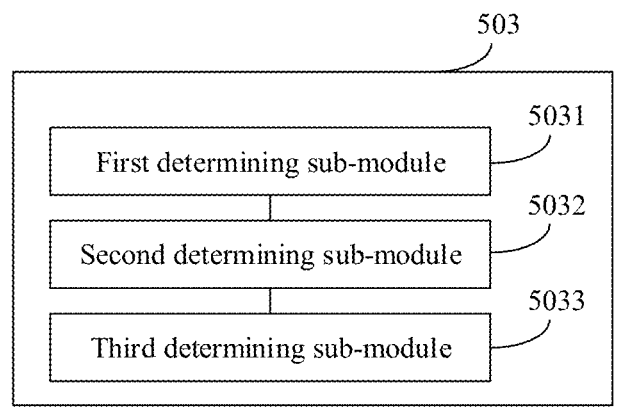
FIG. 14 is a schematic structural diagram of a first determining module according to an embodiment of the present disclosure.

Optionally, referring to FIG. 14, the first determining module 503 may include:
a first determining sub-module 5031 configured to determine a first second derivative of the first candidate pixel value based on the first candidate pixel value and the pixel value of the target original pixel;
a second determining sub-module 5032 configured to determine the second derivative of the pixel value of the target original pixel based on the pixel value of the target original pixel and a pixel value of each pixel adjacent to the target original pixel; and
a third determining sub-module 5033 configured to determine a first difference between the first second derivative and the second derivative of the pixel value of the target original pixel.

Figure 15:
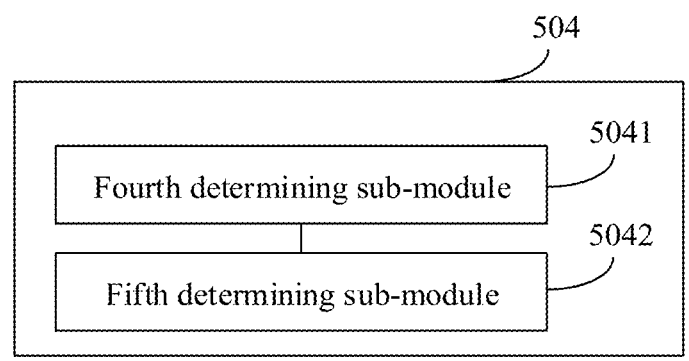
FIG. 15 is a schematic structural diagram of a second determining module according to an embodiment of the present disclosure.

Referring to FIG. 15, the second determining module 504 may include:
a fourth determining sub-module 5041 configured to determine a second second derivative of the second candidate pixel value based on the second candidate pixel value and the pixel value of the target original pixel;
a fifth determining sub-module 5042 configured to determine a second difference between the second second derivative and the second derivative of the pixel value of the target original pixel.

Optionally, the target original pixel may include two first target pixels and two second target pixels, wherein a connecting line between each of the first target pixels and the interpolation pixel extends in a first direction, and a connecting line between each of the second target pixels and the interpolation pixel extends in a second direction, the first direction being perpendicular to the second direction.

The first determining sub-module 5031 is configured to:
determine a second derivative of the first candidate pixel value in the first direction based on the first candidate pixel value and pixel values of the two first target pixels;
and determine a second derivative of the first candidate pixel in the second direction based on the first candidate pixel value and pixel values of the two second target pixels.

The second determining sub-module 5032 may be configured to:
determine, for each target pixel in the two first target pixels and the two second target pixels, a second derivative of a pixel value of the target pixel in the first direction based on the pixel value of the target pixel and a pixel value of a pixel, whose connecting line with the target pixel extends in the first direction, among pixels adjacent to the target pixel; and determine, for each target pixel in the two first target pixels and the two second target pixels, a second derivative of a pixel value of the target pixel in the second direction based on the pixel value of the target pixel and a pixel value of a pixel, whose connecting line with the target pixel extends in the second direction, among the pixels adjacent to the target pixel.

The third determining sub-module 5033 may be configured to:
acquire four differences in the first direction by determining, for each target pixel in the two first target pixels and the two second target pixels, a difference between the second derivative of the first candidate pixel value in the first direction and the second derivative of the pixel value of the target pixel in the first direction;
acquire four differences in the second direction by determining, for each target pixel in the two first target pixels and the two second target pixels, a difference between the second derivative of the first candidate pixel value in the second direction and the second derivative of the pixel value of the target pixel in the second direction; and
acquire the first difference by summing the four differences in the first direction and the four differences in the second direction.

Optionally, two first target pixels corresponding to an interpolation pixel in an $i^{th}$ row and a $j^{th}$ column in the interpolation image are a pixel in an $(i+1)^{th}$ row and a $(j-1)^{th}$ column and a pixel in an $(i-1)^{th}$ row and a $(j+1)^{th}$ column in the interpolation image, respectively; and two second target pixels corresponding to the interpolation pixel in the $i^{th}$ row and the $j^{th}$ column in the interpolation image are a pixel in the $(i-1)^{th}$ row and the $(j-1)^{th}$ column and a pixel in the $(i+1)^{th}$ row and the $(j+1)^{th}$ column in the interpolation image, respectively.

A second derivative $I_{11}^{+}(i, j)$ of a first candidate pixel value of the interpolation pixel in the $i^{th}$ row and the $i^{th}$ column in the first direction satisfies:

$$I_{11}^{+}(i,j)=I(i+1,j-1)+I(i-1,j+1)-2\times[I(i,j)+\Delta];$$

wherein $I(i+1, j-1)$ is a pixel value of the pixel in the $(i+1)^{th}$ row and the $(j-1)^{th}$ column; $I(i-1, j+1)$ is a pixel value of the pixel in the $(i-1)^{th}$ row and the $(j+1)^{th}$ column; $I(i, j)$ is an initial pixel value of the pixel in the $i^{th}$ row and the $j^{th}$ column; $\Delta$ is a pixel step value; and i and j are both positive integers greater than 1.

A second derivative $I_{22}^{+}(i, j)$ of the first candidate pixel value of the interpolation pixel in the $i^{th}$ row and the $j^{th}$ column in the second direction satisfies:

$$I_{22}^{+}(i,j)=I(i-1,j-1)+I(i+1,j+1)-2\times[I(i,j)+\Delta];$$

wherein $I(i-1, j-1)$ is a pixel value of the pixel in the $(i-1)^{th}$ row and the $(j-1)^{th}$ column; and $I(i+1, j+1)$ is a pixel value of the pixel in the $(i+1)^{th}$ row and the $(j+1)^{th}$ column.

Optionally, the fourth determining sub-module 5041 is configured to:
determine a second derivative of the second candidate pixel value in the first direction based on the second candidate pixel value and pixel values of the two first target pixels; and determine a second derivative of the second candidate pixel value in the second direction based on the second candidate pixel value and pixel values of the two second target pixels.

The fifth determining sub-module 5043 is configured to:
acquire four differences in the first direction by determining, for each target pixel in the two first target pixels and the two second target pixels, a difference between the second derivative of the second candidate pixel value in the first direction and the second derivative of the pixel value of the target pixel in the first direction;
acquire four differences in the second direction by determining, for each target pixel in the two first target pixels and the two second target pixels, a difference between the second derivative of the second candidate pixel value in the second direction and the second derivative of the pixel value of the target pixel in the second direction; and acquire the second difference by summing the four differences in the first direction and the four differences in the second direction.

Optionally, a second derivative $I_{11}^-(i, j)$ of the second candidate pixel value of the interpolation pixel in the $i^{th}$ row and the $j^{th}$ column in the first direction satisfies:

$$I_{11}^-(i,j)=I(i+1,j-1)+I(i-1,j+1)-2\times[I(i,j)-\Delta];$$

wherein I (i+1, j−1) is a pixel value of the pixel in the $(i+1)^{th}$ row and the $(j-1)^{th}$ column; I (i−1, j+1) is a pixel value of the pixel in the $(i-1)^{th}$ row and the $(j+1)^{th}$ column; I (i, j) is the initial pixel value of the pixel in the $i^{th}$ row and the $j^{th}$ column; $\Delta$ is the pixel step value; and i and j are both positive integers greater than 1.

A second derivative $I_{22}^-(i, j)$ of the second candidate pixel value of the interpolation pixel in the $i^{th}$ row and the $j^{th}$ column in the second direction satisfies:

$$I_{22}^-(i,j)=I(i-1,j-1)+I(i+1,j+1)-2\times[I(i,j)-\Delta];$$

wherein I (i−1, j−1) is a pixel value of the pixel in the $(i-1)^{th}$ row and the $(j-1)^{th}$ column; and I (i+1, j+1) is a pixel value of the pixel in the $(i+1)^{th}$ row and the $(j+1)^{th}$ column.

Figure 16:
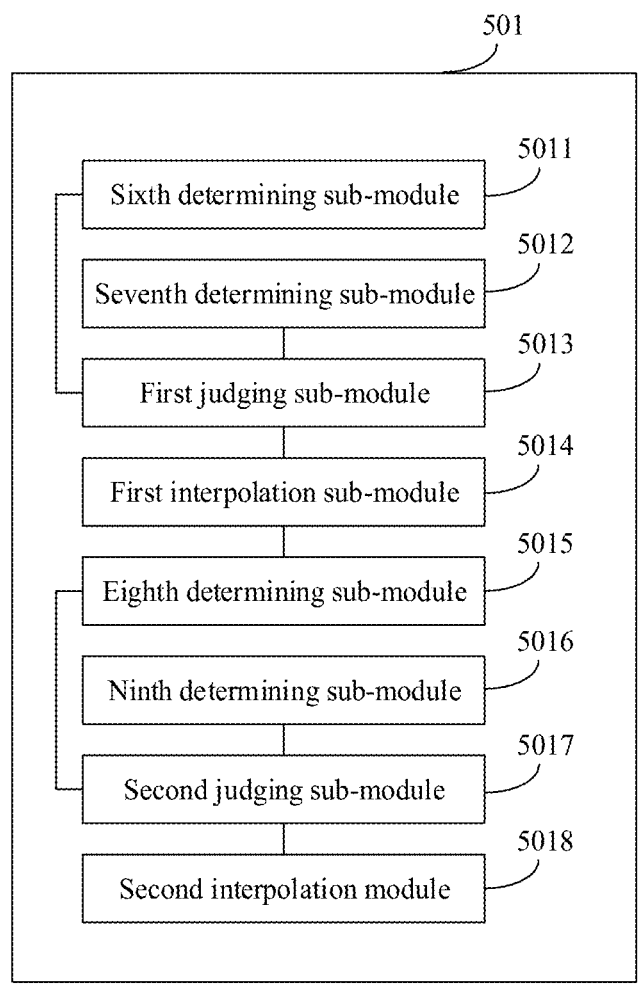
FIG. 16 is a schematic structural diagram of an interpolation processing module according to an embodiment of the present disclosure.

Optionally, referring to FIG. 16, the interpolation processing module 501 may include:

a sixth determining sub-module 5011 configured to determine a first gradient of a first to-be-interpolated region in the to-be-processed image in a first direction;

a seventh determining sub-module 5012 configured to determine a second gradient of the first to-be-interpolated region in a second direction perpendicular to the first direction;

a first judging sub-module 5013 is configured to determine whether the first gradient is greater than the second gradient;

a first interpolation sub-module 5014 configured to acquire, in the case that the first gradient is greater than the second gradient, an initial interpolation image by performing interpolation processing on the first to-be-interpolated region in the second direction by using an interpolation algorithm; and acquire, in the case that the second gradient is greater than the first gradient, an initial interpolation image by performing interpolation processing on the first to-be-interpolated region in the first direction by using an interpolation algorithm;

an eighth determining sub-module 5015 configured to determine a third gradient of a second to-be-interpolated region in the initial interpolation image in a third direction, wherein an included angle between the third direction and the first direction is 45 degrees;

a ninth determining sub-module 5016 configured to determine a fourth gradient of the second to-be-interpolated region in a fourth direction perpendicular to the third direction;

a second judging sub-module 5017 configured to determine whether the third gradient is greater than the fourth gradient; and a second interpolation sub-module 5018 configured to acquire, in the case that the third gradient is greater than the fourth gradient, an interpolation image by performing interpolation processing on the second to-be-interpolated region in the fourth direction by using an interpolation algorithm; and acquire, in the case that the fourth gradient is greater than the third gradient, an interpolation image by performing interpolation processing on the second to-be-interpolated region in the third direction by using an interpolation algorithm.

Optionally, a pixel in a $(2i-1)^{th}$ row and a $(2i-1)^{th}$ column in the interpolation image is the original pixel, and a pixel value of the pixel in the $(2i-1)^{th}$ row and the $(2i-1)^{th}$ column in the interpolation image is equal to a pixel value of a pixel in an $i^{th}$ row and a $j^{th}$ column in the to-be-processed image.

In summary, an apparatus for processing an image is provided by the embodiment of the present disclosure. According to the apparatus, interpolation processing can be performed on a to-be-processed image first to acquire an interpolation image; and an initial pixel value of each interpolation pixel in the interpolation image is then updated, wherein a difference between a second derivative of an updated pixel value of the interpolation pixel and a second derivative of a pixel value of a target original pixel in the interpolation image is relatively small, such that artifacts generated in the interpolation image are reduced, thereby improving the image continuity in a region where the interpolation pixels are located in the interpolation image, and improving the quality of the final processed image.

It can be clearly understood by those skilled in the art that, for convenience and conciseness of the description, the specific working processes of the apparatus, the modules, and the sub-modules as described above may refer to the corresponding process in the foregoing method embodiments, which are not repeated herein again.

Figure 17:
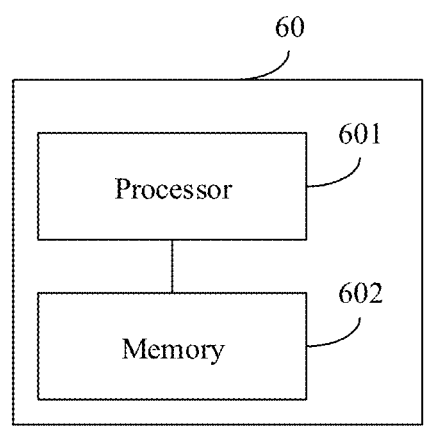
FIG. 17 is a schematic structural diagram of another apparatus for processing an image according to an embodiment of the present disclosure.

FIG. 17 is a schematic structural diagram of another apparatus for processing an image according to an embodiment of the present disclosure. Referring to FIG. 17, it can be seen that the apparatus 60 may include a processor 601, a memory 602, and a computer program stored in the memory 602 and executable by the processor, wherein the processor 601, when executing the computer program, is caused to perform the method for processing the image as described in the above method embodiments, for example, to perform the methods as shown in FIG. 1, FIG. 2, and FIG. 6 to FIG. 11.

A computer-readable storage medium is provided by an embodiment of the present disclosure. The computer-readable storage medium stores an operation therein, when loaded and executed by a computer, causes the computer to perform the method for processing the image as described in the above method embodiments, for example, to perform the methods as shown in FIG. 1, FIG. 2, and FIG. 6 to FIG. 11.

A computer program product including instructions is provided by an embodiment of the present disclosure. The computer program product, when loaded and executed by a computer, causes the computer to perform the method for processing the image as described in the above method embodiments, for example, to perform the methods as shown in FIG. 1, FIG. 2, and FIG. 6 to FIG. 11.

It may be understood by those skilled in the art that all or part of steps in the above embodiments may be completed by hardware, or a program instructing relevant hardware. The program may be stored in a computer-readable storage medium which may be a read-only memory, a magnetic disk, an optical disc, or the like.

A display apparatus is provided by an embodiment of the present disclosure. The display apparatus may include a display panel and the apparatus for processing the image as described in the above embodiment. The display panel is configured to display an image processed by the apparatus for processing the image.

Optionally, the display apparatus may be any product or component having a display function, such as a liquid crystal display apparatus, electronic paper, an organic light-emitting diode (OLED) display apparatus, an active-matrix organic light-emitting diode (AMOLED) display apparatus, a mobile phone, a tablet computer, a television, a display, a notebook computer, a digital photo frame, a navigator, or the like.

The foregoing descriptions are merely optional embodiments of the present disclosure, and are not intended to limit the present disclosure. Within the spirit and principles of the present disclosure, any modifications, equivalent substitutions, improvements, and the like, should be within the protection scope of the present disclosure.

What is claimed is:

1. A method for processing an image, comprising:

acquiring an interpolation image by performing interpolation processing on a to-be-processed image, wherein the interpolation image comprises a plurality of original pixels and a plurality of interpolation pixels, an initial pixel value of each of the interpolation pixels being determined based on a pixel value of at least one of the original pixels;

acquiring, for each of the interpolation pixels, a first candidate pixel value and a second candidate pixel value by adjusting the initial pixel value of the interpolation pixel, wherein the first candidate pixel value is greater than the initial pixel value, and the second candidate pixel value is less than the initial pixel value;

determining a first second derivative of the first candidate pixel value based on the first candidate pixel value and a pixel value of a target original pixel;

determining a second derivative of the pixel value of the target original pixel based on the pixel value of the target original pixel and a pixel value of each pixel adjacent to the target original pixel;

determining a first difference between the first second derivative and the second derivative of the pixel value of the target original pixel;

determining a second second derivative of the second candidate pixel value based on the second candidate pixel value and the pixel value of the target original pixel; and determining a second difference between the second second derivative and the second derivative of the pixel value of the target original pixel; and updating the initial pixel value of the interpolation pixel by using a candidate pixel value corresponding to a smaller one of the first difference and the second difference;

wherein the target original pixel comprises each original pixel adjacent to the interpolation pixel among the plurality of original pixels.

2. The method according to claim 1, wherein said acquiring the first candidate pixel value and the second candidate pixel value by adjusting the initial pixel value of the interpolation pixel comprises:

acquiring the first candidate pixel value by adding a pixel step value to the initial pixel value of the interpolation pixel; and acquiring the second candidate pixel value by subtracting the pixel step value from the initial pixel value of the interpolation pixel.

3. The method according to claim 1, wherein the target original pixel comprises two first target pixels and two second target pixels, wherein a connecting line between each of the first target pixels and the interpolation pixel extends in a first direction, and a connecting line between each of the second target pixels and the interpolation pixel extends in a second direction, the first direction being perpendicular to the second direction;

said determining the first second derivative of the first candidate pixel value based on the first candidate pixel value and the pixel value of the target original pixel comprises:

determining a second derivative of the first candidate pixel value in the first direction based on the first candidate pixel value and pixel values of the two first target pixels; and determining a second derivative of the first candidate pixel value in the second direction based on the first candidate pixel value and pixel values of the two second target pixels;

said determining the second derivative of the pixel value of the target original pixel based on the pixel value of the target original pixel and the pixel value of each pixel adjacent to the target original pixel comprises:

determining, for each target pixel in the two first target pixels and the two second target pixels, a second derivative of a pixel value of the target pixel in the first direction based on the pixel value of the target pixel and a pixel value of a pixel, whose connecting line with the target pixel extends in the first direction, among pixels adjacent to the target pixel; and determining, for each target pixel in the two first target pixels and the two second target pixels, a second derivative of a pixel value of the target pixel in the second direction based on the pixel value of the target pixel and a pixel value of a pixel, whose connecting line with the target pixel extends in the second direction, among the pixels adjacent to the target pixel; and said determining the first difference between the first second derivative and the second derivative of the pixel value of the target original pixel comprises:

acquiring four differences in the first direction by determining, for each target pixel in the two first target pixels and the two second target pixels, a difference between the second derivative of the first candidate pixel value in the first direction and the second derivative of the pixel value of the target pixel in the first direction;

acquiring four differences in the second direction by determining, for each target pixel in the two first target pixels and the two second target pixels, a difference between the second derivative of the first candidate pixel value in the second direction and the second derivative of the pixel value of the target pixel in the second direction; and acquiring the first difference by summing the four differences in the first direction and the four differences in the second direction.

4. The method according to claim 3, wherein two first target pixels corresponding to an interpolation pixel in an $i^{th}$ row and a $j^{th}$ column in the interpolation image are a pixel in an $(i+1)^{th}$ row and a $(j-1)^{th}$ column and a pixel in an $(i-1)^{th}$ row and a $(j+1)^{th}$ column in the interpolation image; two second target pixels corresponding to the interpolation pixel in the $i^{th}$ row and the $j^{th}$ column in the interpolation image are a pixel in the $(i-1)^{th}$ row and the $(j-1)^{th}$ column and a pixel in the $(i+1)^{th}$ row and the $(j+1)^{th}$ column in the interpolation image; a second derivative $I_{11}^+(i, j)$ of a first candidate pixel value of the interpolation pixel in the $i^{th}$ row and the $j^{th}$ column in the first direction satisfies:

$$I_{11}^+(i,j)=I(i+1,j-1)+I(i-1,j+1)-2\times[I(i,j)+\Delta];$$

wherein I (i+1, j−1) is a pixel value of the pixel in the $(i+1)^{th}$ row and the $(j−1)^{th}$ column; I (i−1, j+1) is a pixel value of the pixel in the $(i−1)^{th}$ row and the $(j+1)^{th}$ column; I (i, j) is an initial pixel value of the pixel in the $i^{th}$ row and the $j^{th}$ column; $\Delta$ is a pixel step value; and i and j are both positive integers greater than 1; and a second derivative $I_{22}^+(i, j)$ of the first candidate pixel value of the interpolation pixel in the $i^{th}$ row and the $j^{th}$ column in the second direction satisfies:

$$I_{22}^+(i,j)=I(i-1,j-1)+I(i+1,j+1)-2\times[I(i,j)+\Delta];$$

wherein I (i−1, j−1) is a pixel value of the pixel in the $(i−1)^{th}$ row and the $(j−1)^{th}$ column; and I (i+1, j+1) is a pixel value of the pixel in the $(i+1)^{th}$ row and the $(j+1)^{th}$ column.

5. The method according to claim 1, wherein the target original pixel comprises two first target pixels and two second target pixels, wherein a connecting line between each of the first target pixels and the interpolation pixel extends in a first direction, and a connecting line between each of the second target pixels and the interpolation pixel extends in a second direction, the first direction being perpendicular to the second direction;

said determining the second second derivative of the second candidate pixel value based on the second candidate pixel value and the pixel value of the target original pixel comprises:

determining a second derivative of the second candidate pixel value in the first direction based on the second candidate pixel value and pixel values of the two first target pixels; and determining a second derivative of the second candidate pixel value in the second direction based on the second candidate pixel value and pixel values of the two second target pixels;

said determining the second derivative of the pixel value of the target original pixel based on the pixel value of the target original pixel and the pixel value of each pixel adjacent to the target original pixel comprises:

determining, for each target pixel in the two first target pixels and the two second target pixels, a second derivative of a pixel value of the target pixel in the first direction based on the pixel value of the target pixel and a pixel value of a pixel, whose connecting line with the target pixel extends in the first direction, among pixels adjacent to the target pixel; and determining, for each target pixel in the two first target pixels and the two second target pixels, a second derivative of a pixel value of the target pixel in the second direction based on the pixel value of the target pixel and a pixel value of a pixel, whose connecting line with the target pixel extends in the second direction, among the pixels adjacent to the target pixel; and said determining the second difference between the second second derivative and the second derivative of the pixel value of the target original pixel comprises:

acquiring four differences in the first direction by determining, for each target pixel in the two first target pixels and the two second target pixels, a difference between the second derivative of the second candidate pixel value in the first direction and the second derivative of the pixel value of the target pixel in the first direction;

acquiring four differences in the second direction by determining, for each target pixel in the two first target pixels and the two second target pixels, a difference between the second derivative of the second candidate pixel value in the second direction and the second derivative of the pixel value of the target pixel in the second direction; and acquiring the second difference by summing the four differences in the first direction and the four differences in the second direction.

6. The method according to claim 5, wherein two first target pixels corresponding to an interpolation pixel in an $i^{th}$ row and a $j^{th}$ column in the interpolation image are a pixel in an $(i+1)^{th}$ row and a $(j−1)^{th}$ column and a pixel in an $(i−1)^{th}$ row and a $(j+1)^{th}$ column in the interpolation image; two second target pixels corresponding to the interpolation pixel in the $i^{th}$ row and the $j^{th}$ column in the interpolation image are a pixel in the $(i−1)^{th}$ row and the $(j−1)^{th}$ column and a pixel in the $(i+1)^{th}$ row and the $(j+1)^{th}$ column in the interpolation image; a second derivative $I_{11}^-(i, j)$ of a second candidate pixel value of the interpolation pixel in the $i^{th}$ row and the $j^{th}$ column in the first direction satisfies:

$$I_{11}^-(i,j)=I(i+1,j-1)+I(i-1,j+1)-2\times[I(i,j)-\Delta];$$

wherein I (i+1, j−1) is a pixel value of the pixel in the $(i+1)^{th}$ row and the $(j−1)^{th}$ column; I (i−1, j+1) is a pixel value of the pixel in the $(i−1)^{th}$ row and the $(j+1)^{th}$ column; I (i, j) is the initial pixel value of the pixel in the $i^{th}$ row and the $j^{th}$ column; $\Delta$ is a pixel step value; and i and j are both positive integers greater than 1; and a second derivative $I_{22}^-(i, j)$ of a second candidate pixel value of the interpolation pixel in the $i^{th}$ row and the $j^{th}$ column in the second direction satisfies:

$$I_{22}^-(i,j)=I(i-1,j-1)+I(i+1,j+1)-2\times[I(i,j)-\Delta];$$

wherein I (i−1, j−1) is a pixel value of the pixel in the $(i−1)^{th}$ row and the $(j−1)^{th}$ column; and I (i+1, j+1) is a pixel value of the pixel in the $(i+1)^{th}$ row and the $(j+1)^{th}$ column.

7. The method according to claim 1, wherein said acquiring the interpolation image by performing interpolation processing on the to-be-processed image comprises:

determining a first gradient of a first to-be-interpolated region in the to-be-processed image in a first direction;

determining a second gradient of the first to-be-interpolated region in a second direction perpendicular to the first direction;

in the case that the first gradient is greater than the second gradient, acquiring an initial interpolation image by performing interpolation processing on the first to-be-interpolated region in the second direction by using an interpolation algorithm;

in the case that the second gradient is greater than the first gradient, acquiring an initial interpolation image by performing interpolation processing on the first to-be-interpolated region in the first direction by using an interpolation algorithm;

determining a third gradient of a second to-be-interpolated region in the initial interpolation image in a third direction, wherein an included angle between the third direction and the first direction is 45 degrees;

determining a fourth gradient of the second to-be-interpolated region in a fourth direction perpendicular to the third direction;

in the case that the third gradient is greater than the fourth gradient, acquiring an interpolation image by performing interpolation processing on the second to-be-interpolated region in the fourth direction by using an interpolation algorithm; and in the case that the fourth gradient is greater than the third gradient, acquiring an interpolation image by performing interpolation processing on the second to-be-interpolated region in the third direction by using an interpolation algorithm.

8. The method according to claim 1, wherein a pixel in a $(2i-1)^{th}$ row and a $(2i-1)^{th}$ column in the interpolation image is the original pixel, and a pixel value of the pixel in the $(2i-1)^{th}$ row and the $(2i-1)^{th}$ column in the interpolation image is equal to a pixel value of a pixel in an $i^{th}$ row and a $j^{th}$ column in the to-be-processed image.

9. A non-transitory computer-readable storage medium storing an instruction therein, wherein the instruction, when loaded and executed by a computer, causes the computer to perform the method for processing the image as defined in claim 1.

10. A device for processing an image, comprising:
a processor; and
a memory configured to store one or more instructions executable by the processor;
wherein the processor, when loading and executing the one or more instructions, is caused to perform:
acquiring an interpolation image by performing interpolation processing on a to-be-processed image, wherein the interpolation image comprises a plurality of original pixels and a plurality of interpolation pixels, an initial pixel value of each of the interpolation pixels being determined based on a pixel value of at least one of the original pixels;
acquiring, for each of the interpolation pixels, a first candidate pixel value and a second candidate pixel value by adjusting the initial pixel value of the interpolation pixel, wherein the first candidate pixel value is greater than the initial pixel value, and the second candidate pixel value is less than the initial pixel value;
determining a first second derivative of the first candidate pixel value based on the first candidate pixel value and a pixel value of a target original pixel;
determining a second derivative of the pixel value of the target original pixel based on the pixel value of the target original pixel and a pixel value of each pixel adjacent to the target original pixel;
determining a first difference between the first second derivative and the second derivative of the pixel value of the target original pixel;
determining a second second derivative of the second candidate pixel value based on the second candidate pixel value and the pixel value of the target original pixel; and
determining a second difference between the second second derivative and the second derivative of the pixel value of the target original pixel; and
updating the initial pixel value of the interpolation pixel by using a candidate pixel value corresponding to a smaller one of the first difference and the second difference;
wherein the target original pixel comprises each original pixel adjacent to the interpolation pixel among the plurality of original pixels.

11. The device according to claim 10, wherein the processor, when loading and executing the one or more instructions, is caused to perform:
acquiring the first candidate pixel value by adding a pixel step value to the initial pixel value of the interpolation pixel; and
acquiring the second candidate pixel value by subtracting the pixel step value from the initial pixel value of the interpolation pixel.

12. The device according to claim 10, wherein the target original pixel comprises two first target pixels and two second target pixels, wherein a connecting line between each of the first target pixels and the interpolation pixel extends in a first direction, and a connecting line between each of the second target pixels and the interpolation pixel extends in a second direction, the first direction being perpendicular to the second direction; and
the processor, when loading and executing the one or more instructions, is caused to perform:
determining a second derivative of the first candidate pixel value in the first direction based on the first candidate pixel value and pixel values of the two first target pixels;
determining a second derivative of the first candidate pixel value in the second direction based on the first candidate pixel value and pixel values of the two second target pixels;
determining, for each target pixel in the two first target pixels and the two second target pixels, a second derivative of a pixel value of the target pixel in the first direction based on the pixel value of the target pixel and a pixel value of a pixel, whose connecting line with the target pixel extends in the first direction, among pixels adjacent to the target pixel;
determining, for each target pixel in the two first target pixels and the two second target pixels, a second derivative of a pixel value of the target pixel in the second direction based on the pixel value of the target pixel and a pixel value of a pixel, whose connecting line with the target pixel extends in the second direction, among the pixels adjacent to the target pixel;
acquiring four differences in the first direction by determining, for each target pixel in the two first target pixels and the two second target pixels, a difference between the second derivative of the first candidate pixel value in the first direction and the second derivative of the pixel value of the target pixel in the first direction;
acquiring four differences in the second direction by determining, for each target pixel in the two first target pixels and the two second target pixels, a difference between the second derivative of the first candidate pixel value in the second direction and the second derivative of the pixel value of the target pixel in the second direction; and
acquiring the first difference by summing the four differences in the first direction and the four differences in the second direction.

13. The device according to claim 12, wherein two first target pixels corresponding to an interpolation pixel in an $i^{th}$ row and a $j^{th}$ column in the interpolation image are a pixel in an $(i+1)^{th}$ row and a $(j-1)^{th}$ column and a pixel in an $(i-1)^{th}$ row and a $(j+1)^{th}$ column in the interpolation image; two second target pixels corresponding to the interpolation pixel in the $i^{th}$ row and the $j^{th}$ column in the interpolation image are a pixel in the $(i-1)^{th}$ row and the $(j-1)^{th}$ column and a pixel in the $(i+1)^{th}$ row and the $(j+1)^{th}$ column in the interpolation image; a second derivative $I_{11}^+(i, j)$ of a first candidate pixel value of the interpolation pixel in the $i^{th}$ row and the $j^{th}$ column in the first direction satisfies:

$$I_{11}^+(i,j)=I(i+1,j-1)+I(i-1,j+1)-2\times[I(i,j)+\Delta];$$

wherein I (i+1, j−1) is a pixel value of the pixel in the $(i+1)^{th}$ row and the $(j-1)^{th}$ column; I (i−1, j+1) is a pixel value of the pixel in the $(i-1)^{th}$ row and the $(j+1)^{th}$ column; I (i, j) is an initial pixel value of the pixel in the $i^{th}$ row and the $j^{th}$ column; $\Delta$ is a pixel step value; and i and j are both positive integers greater than 1; and a second derivative $I_{22}^+(i, j)$ of the first candidate pixel value of the interpolation pixel in the $i^{th}$ row and the $j^{th}$ column in the second direction satisfies:

$$I_{22}^+(i,j)=I(i-1,j-1)+I(i+1,j+1)-2\times[I(i,j)+\Delta];$$

wherein I (i−1, j−1) is a pixel value of the pixel in the $(i-1)^{th}$ row and the $(j-1)^{th}$ column; and I (i+1, j+1) is a pixel value of the pixel in the $(i+1)^{th}$ row and the $(j+1)^{th}$ column.

14. The device according to claim 10, wherein the target original pixel comprises two first target pixels and two second target pixels, wherein a connecting line between each of the first target pixels and the interpolation pixel extends in a first direction, and a connecting line between each of the second target pixels and the interpolation pixel extends in a second direction, the first direction being perpendicular to the second direction; and the processor, when loading and executing the one or more instructions, is caused to perform:

determining a second derivative of the second candidate pixel value in the first direction based on the second candidate pixel value and pixel values of the two first target pixels;

determining a second derivative of the second candidate pixel value in the second direction based on the second candidate pixel value and pixel values of the two second target pixels;

determining, for each target pixel in the two first target pixels and the two second target pixels, a second derivative of a pixel value of the target pixel in the first direction based on the pixel value of the target pixel and a pixel value of a pixel, whose connecting line with the target pixel extends in the first direction, among pixels adjacent to the target pixel;

determining, for each target pixel in the two first target pixels and the two second target pixels, a second derivative of a pixel value of the target pixel in the second direction based on the pixel value of the target pixel and a pixel value of a pixel, whose connecting line with the target pixel extends in the second direction, among the pixels adjacent to the target pixel;

acquiring four differences in the first direction by determining, for each target pixel in the two first target pixels and the two second target pixels, a difference between the second derivative of the second candidate pixel value in the first direction and the second derivative of the pixel value of the target pixel in the first direction;

acquiring four differences in the second direction by determining, for each target pixel in the two first target pixels and the two second target pixels, a difference between the second derivative of the second candidate pixel value in the second direction and the second derivative of the pixel value of the target pixel in the second direction; and acquiring the second difference by summing the four differences in the first direction and the four differences in the second direction.

15. The device according to claim 14, wherein two first target pixels corresponding to an interpolation pixel in an $i^{th}$ row and a $j^{th}$ column in the interpolation image are a pixel in an $(i+1)^{th}$ row and a $(j-1)^{th}$ column and a pixel in an $(i-1)^{th}$ row and a $(j+1)^{th}$ column in the interpolation image; two second target pixels corresponding to the interpolation pixel in the $i^{th}$ row and the $j^{th}$ column in the interpolation image are a pixel in the $(i-1)^{th}$ row and the $(j-1)^{th}$ column and a pixel in the $(i+1)^{th}$ row and the $(j+1)^{th}$ column in the interpolation image; a second derivative $I_{11}^-(i, j)$ of a second candidate pixel value of the interpolation pixel in the $i^{th}$ row and the $j^{th}$ column in the first direction satisfies:

$$I_{11}^-(i,j)=I(i+1,j-1)+I(i-1,j+1)-2\times[I(i,j)-\Delta];$$

wherein I (i+1, j−1) is a pixel value of the pixel in the $(i+1)^{th}$ row and the $(j-1)^{th}$ column; I (i−1, j+1) is a pixel value of the pixel in the $(i-1)^{th}$ row and the $(j+1)^{th}$ column; I (i, j) is the initial pixel value of the pixel in the $i^{th}$ row and the $j^{th}$ column; $\Delta$ is a pixel step value; and i and j are both positive integers greater than 1; and a second derivative $I_{22}^-(i, j)$ of a second candidate pixel value of the interpolation pixel in the $i^{th}$ row and the $j^{th}$ column in the second direction satisfies:

$$I_{22}^-(i,j)=I(i-1,j-1)+I(i+1,j+1)-2\times[I(i,j)-\Delta];$$

wherein I (i−1, j−1) is a pixel value of the pixel in the $(i-1)^{th}$ row and the $(j-1)^{th}$ column; and I (i+1, j+1) is a pixel value of the pixel in the $(i+1)^{th}$ row and the $(j+1)^{th}$ column.

16. The device according to claim 10, wherein the processor, when loading and executing the one or more instructions, is caused to perform:

determining a first gradient of a first to-be-interpolated region in the to-be-processed image in a first direction;

determining a second gradient of the first to-be-interpolated region in a second direction perpendicular to the first direction;

in the case that the first gradient is greater than the second gradient, acquiring an initial interpolation image by performing interpolation processing on the first to-be-interpolated region in the second direction by using an interpolation algorithm;

in the case that the second gradient is greater than the first gradient, acquiring an initial interpolation image by performing interpolation processing on the first to-be-interpolated region in the first direction by using an interpolation algorithm;

determining a third gradient of a second to-be-interpolated region in the initial interpolation image in a third direction, wherein an included angle between the third direction and the first direction is 45 degrees;

determining a fourth gradient of the second to-be-interpolated region in a fourth direction perpendicular to the third direction;

in the case that the third gradient is greater than the fourth gradient, acquiring an interpolation image by performing interpolation processing on the second to-be-interpolated region in the fourth direction by using an interpolation algorithm; and in the case that the fourth gradient is greater than the third gradient, acquiring an interpolation image by performing interpolation processing on the second to-be-interpolated region in the third direction by using an interpolation algorithm.

17. The device according to claim 10, wherein a pixel in a $(2i-1)^{th}$ row and a $(2i-1)^{th}$ column in the interpolation image is the original pixel, and a pixel value of the pixel in the $(2i-1)^{th}$ row and the $(2i-1)^{th}$ column in the interpolation image is equal to a pixel value of a pixel in an $i^{th}$ row and a $j^{th}$ column in the to-be-processed image.

18. A display device, comprising a display panel and a device for processing an image;
- wherein the display panel is configured to display an image processed by the device for processing the image; and
- the device for processing the image comprises:
- a processor; and
- a memory configured to store one or more instructions executable by the processor;
- wherein the processor, when loading and executing the one or more instructions, is caused to perform:
- acquiring an interpolation image by performing interpolation processing on a to-be-processed image, wherein the interpolation image comprises a plurality of original pixels and a plurality of interpolation pixels, an initial pixel value of each of the interpolation pixels being determined based on a pixel value of at least one of the original pixels;
- acquiring, for each of the interpolation pixels, a first candidate pixel value and a second candidate pixel value by adjusting the initial pixel value of the interpolation pixel, wherein the first candidate pixel value is greater than the initial pixel value, and the second candidate pixel value is less than the initial pixel value;
- determining a first second derivative of the first candidate pixel value based on the first candidate pixel value and a pixel value of a target original pixel;
- determining a second derivative of the pixel value of the target original pixel based on the pixel value of the target original pixel and a pixel value of each pixel adjacent to the target original pixel;
- determining a first difference between the first second derivative and the second derivative of the pixel value of the target original pixel;
- determining a second second derivative of the second candidate pixel value based on the second candidate pixel value and the pixel value of the target original pixel; and
- determining a second difference between the second second derivative and the second derivative of the pixel value of the target original pixel; and
- updating the initial pixel value of the interpolation pixel by using a candidate pixel value corresponding to a smaller one of the first difference and the second difference;
- wherein the target original pixel comprises each original pixel adjacent to the interpolation pixel among the plurality of original pixels.

* * * * *